(12) United States Patent
Adachi

(10) Patent No.: US 9,359,742 B2
(45) Date of Patent: Jun. 7, 2016

(54) SHOVEL

(71) Applicant: SUMITOMO HEAVY INDUSTRIES, LTD., Tokyo (JP)

(72) Inventor: Shuntaro Adachi, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/462,896

(22) Filed: Aug. 19, 2014

(65) Prior Publication Data

US 2014/0353057 A1    Dec. 4, 2014

Related U.S. Application Data

(63) Continuation of application No. PCT/JP2013/053449, filed on Feb. 14, 2013.

(30) Foreign Application Priority Data

Feb. 29, 2012 (JP) .................................. 2012-043182
Feb. 29, 2012 (JP) .................................. 2012-043410

(51) Int. Cl.
*B60R 16/04* (2006.01)
*E02F 9/08* (2006.01)
(Continued)

(52) U.S. Cl.
CPC ................ *E02F 9/0858* (2013.01); *B60K 1/04* (2013.01); *B60L 1/003* (2013.01); *B60L 11/14* (2013.01);
(Continued)

(58) Field of Classification Search
CPC .......................... B60K 1/04; B60K 2001/0438

USPC ......................................................... 180/68.5
See application file for complete search history.

(56) References Cited

U.S. PATENT DOCUMENTS 4,169,191 A * 9/1979 Alt ....................... H01M 2/1083
                                                                180/68.5
4,173,264 A * 11/1979 Erker ....................... B62D 21/14
                                                                180/68.5
(Continued)

FOREIGN PATENT DOCUMENTS

CN        102640347 A        8/2012
DE    11 2010 004 703 T5    11/2012
(Continued)

OTHER PUBLICATIONS

Japanese Office Action Notice of Reasons of Rejection application No. 2014-502122 mailed Aug. 18, 2015.
(Continued)

*Primary Examiner* — Jeffrey J Restifo
(74) *Attorney, Agent, or Firm* — Squire Patton Boggs (US) LLP

(57) ABSTRACT

A shovel including a power storage device; and an electrically driven part driven by discharge electric power from the power storage device. The power storage device includes a lower housing having a bottom panel and side panels; at least two power storage modules arranged at a distance from each other in a first direction on the bottom panel and configured to charge and discharge electrical energy; a first rib formed on the bottom panel of the lower housing, arranged between the two power storage modules, and configured to extend in a second direction intersecting in the first direction; and a second rib formed on the bottom panel of the lower housing, configured to extend in the first direction, and formed continuously with the first rib.

14 Claims, 19 Drawing Sheets

(51) Int. Cl.
*H01G 11/10* (2013.01)
*B60L 1/00* (2006.01)
*B60L 11/14* (2006.01)
*B60L 11/18* (2006.01)
*H01M 2/10* (2006.01)
*H01G 11/82* (2013.01)
*B60K 1/04* (2006.01)

(52) U.S. Cl.
CPC ......... *B60L 11/1877* (2013.01); *B60L 11/1879* (2013.01); *H01G 11/10* (2013.01); *H01G 11/82* (2013.01); *H01M 2/1083* (2013.01); *B60L 2200/40* (2013.01); *B60L 2240/36* (2013.01); *B60L 2240/445* (2013.01); *B60L 2270/145* (2013.01); *Y02E 60/13* (2013.01); *Y02T 10/70* (2013.01); *Y02T 10/7005* (2013.01); *Y02T 10/705* (2013.01); *Y02T 10/7022* (2013.01); *Y02T 10/7077* (2013.01); *Y10S 903/907* (2013.01)

(56) References Cited

U.S. PATENT DOCUMENTS

| | | | | |
|---|---|---|---|---|
| 4,365,681 | A * | 12/1982 | Singh | B60K 1/04 105/51 |
| 5,378,555 | A * | 1/1995 | Waters | H01M 2/1083 180/68.5 |
| 5,390,754 | A * | 2/1995 | Masuyama | H01M 2/1083 105/51 |
| 5,558,949 | A * | 9/1996 | Iwatsuki | H01M 2/1083 180/68.5 |
| 5,585,205 | A * | 12/1996 | Kohchi | B60K 1/04 180/65.1 |
| 5,639,571 | A * | 6/1997 | Waters | B60L 11/1874 180/68.5 |
| 5,983,612 | A * | 11/1999 | Bauswell | A01D 69/02 180/65.1 |
| 6,085,854 | A * | 7/2000 | Nishikawa | B60K 1/04 180/68.5 |
| 6,564,893 | B2 * | 5/2003 | Lipman | H01M 2/1083 180/68.5 |
| 6,632,560 | B1 * | 10/2003 | Zhou | H01M 2/1083 180/68.5 |
| 6,648,085 | B2 * | 11/2003 | Nagura | B60K 1/00 180/65.1 |
| 8,397,853 | B2 * | 3/2013 | Stefani | B62D 25/20 180/65.31 |
| RE44,994 | E * | 7/2014 | Rawlinson | B62D 25/2036 180/68.5 |
| 8,835,033 | B2 * | 9/2014 | Choi | B29C 70/20 180/68.5 |
| 8,960,350 | B2 * | 2/2015 | Kosaki | B60K 1/04 180/65.22 |
| 8,993,142 | B2 * | 3/2015 | Sakai | B60L 11/1874 180/68.5 |
| 9,033,078 | B2 * | 5/2015 | Fillion | B60K 1/04 180/65.31 |
| 2001/0030069 | A1 * | 10/2001 | Misu | B60K 1/04 180/68.1 |
| 2007/0017720 | A1 * | 1/2007 | Fujii | B60R 16/04 180/68.5 |
| 2007/0154757 | A1 * | 7/2007 | Okazaki | B60K 1/04 429/438 |
| 2009/0242299 | A1 * | 10/2009 | Takasaki | B60K 1/04 180/68.5 |
| 2010/0025137 | A1 * | 2/2010 | Mughal | B62J 7/04 180/68.5 |
| 2012/0043147 | A1 * | 2/2012 | Milner | B60K 1/04 180/68.5 |
| 2012/0055725 | A1 * | 3/2012 | Mizoguchi | B60K 1/04 180/68.5 |
| 2012/0103714 | A1 * | 5/2012 | Choi | B60K 1/04 180/68.5 |
| 2012/0234613 | A1 * | 9/2012 | Miyatake | E02F 9/0858 180/65.1 |
| 2012/0301765 | A1 * | 11/2012 | Loo | H01M 2/1083 429/100 |
| 2012/0321927 | A1 * | 12/2012 | Loo | B60K 1/04 429/100 |
| 2013/0037336 | A1 * | 2/2013 | Ojeda | B60K 1/04 180/68.5 |
| 2013/0192914 | A1 * | 8/2013 | Nakamori | B60K 1/04 180/68.5 |
| 2013/0299255 | A1 * | 11/2013 | Matsumura | B60K 1/04 180/65.1 |
| 2013/0313030 | A1 * | 11/2013 | Matsumura | B60K 1/04 180/65.1 |
| 2014/0246259 | A1 * | 9/2014 | Yamamura | B60K 1/04 180/68.5 |
| 2014/0353057 | A1 * | 12/2014 | Adachi | H01G 11/10 180/68.5 |
| 2015/0122562 | A1 * | 5/2015 | Miyashiro | B62M 6/90 180/68.5 |
| 2015/0122563 | A1 * | 5/2015 | Kondo | B62M 6/90 180/68.5 |
| 2015/0180078 | A1 * | 6/2015 | Ikeda | B60L 11/1898 180/68.5 |

FOREIGN PATENT DOCUMENTS

| | | |
|---|---|---|
| JP | 2004-169464 A | 6/2004 |
| JP | 2006-338934 A | 12/2006 |
| JP | 2008-044408 A | 2/2008 |
| JP | 2008-279825 A | 11/2008 |
| JP | 2011-020641 A | 2/2011 |
| JP | 5102902 B2 | 12/2012 |
| JP | 2013-038439 A | 2/2013 |
| JP | 5449891 B2 | 3/2014 |
| KR | 10 2012 0088807 A | 8/2012 |
| WO | WO 2011/070758 A1 | 6/2011 |

OTHER PUBLICATIONS

International Search Report dated May 21, 2013 corresponding to International Patent Application No. PCT/JP2013/053449 and English translation thereof.

* cited by examiner

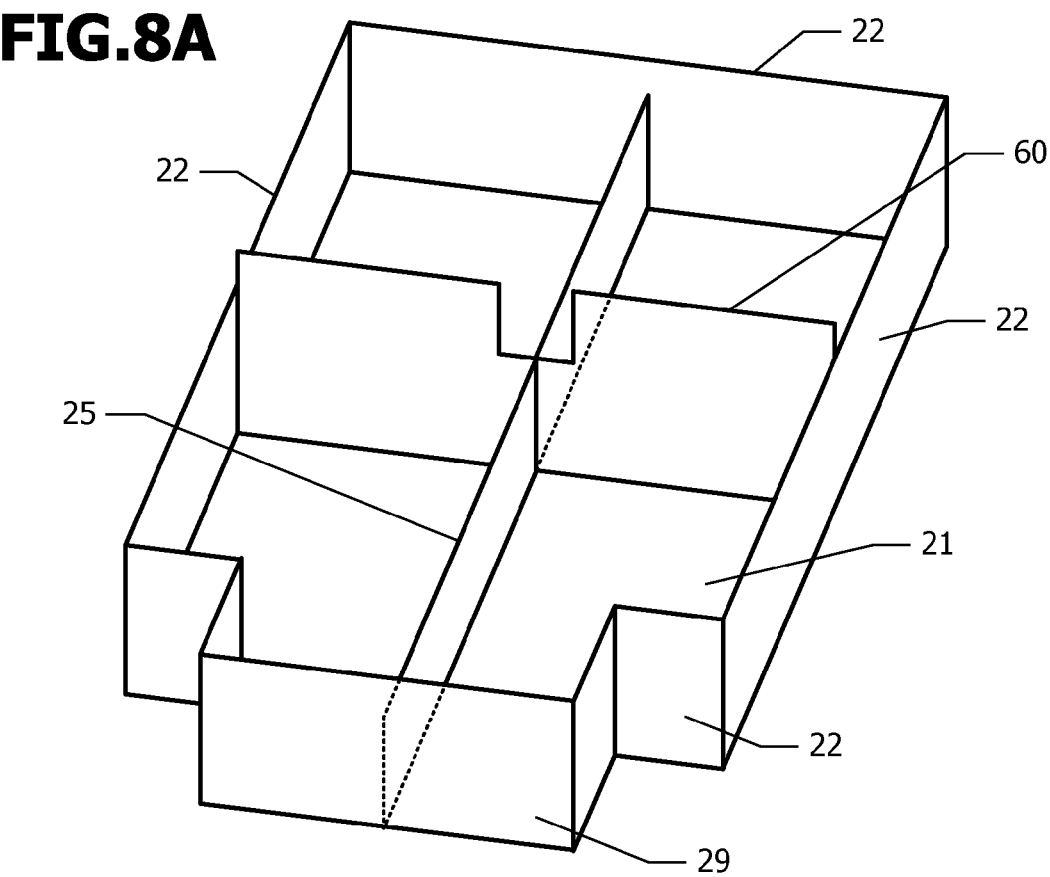
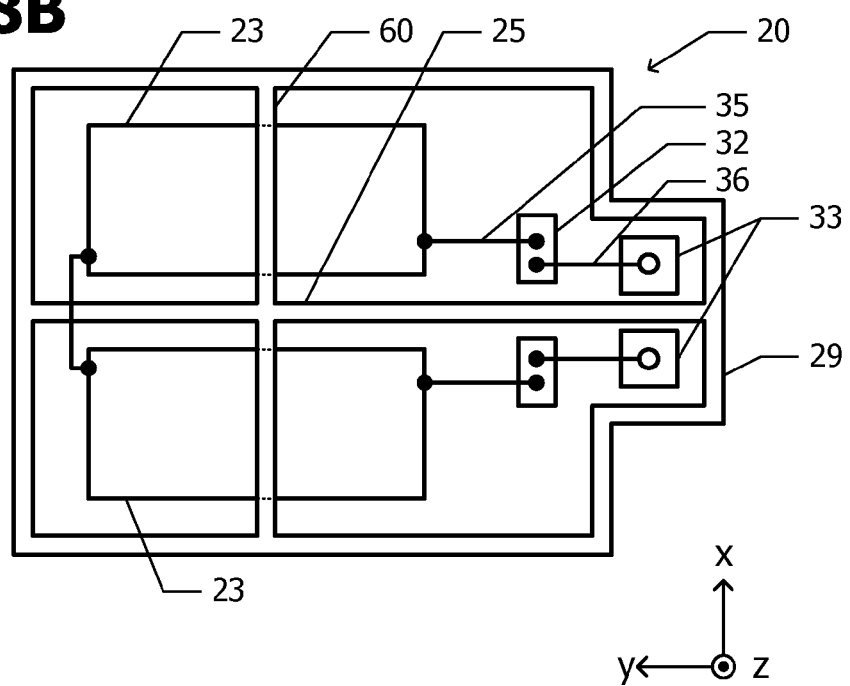

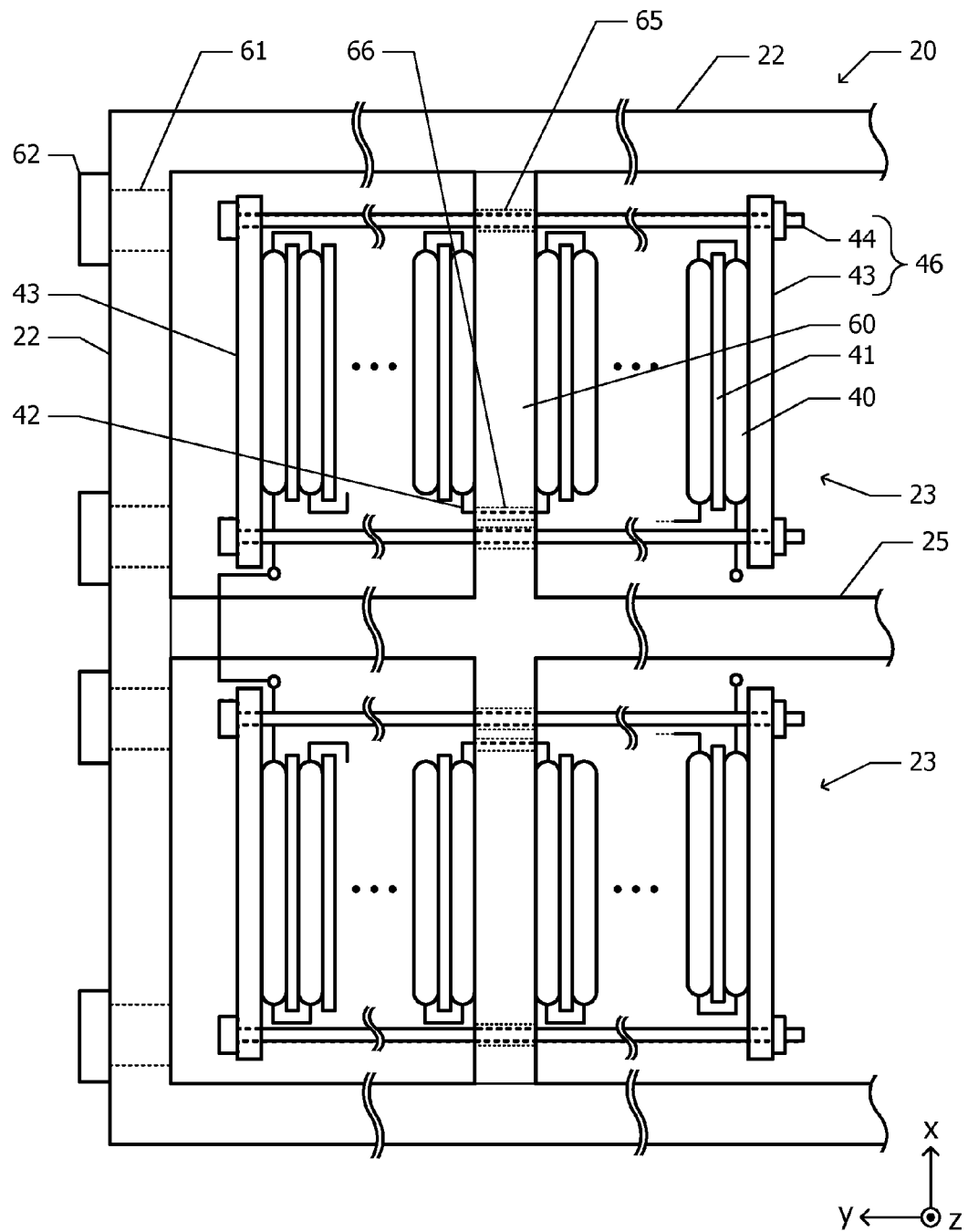

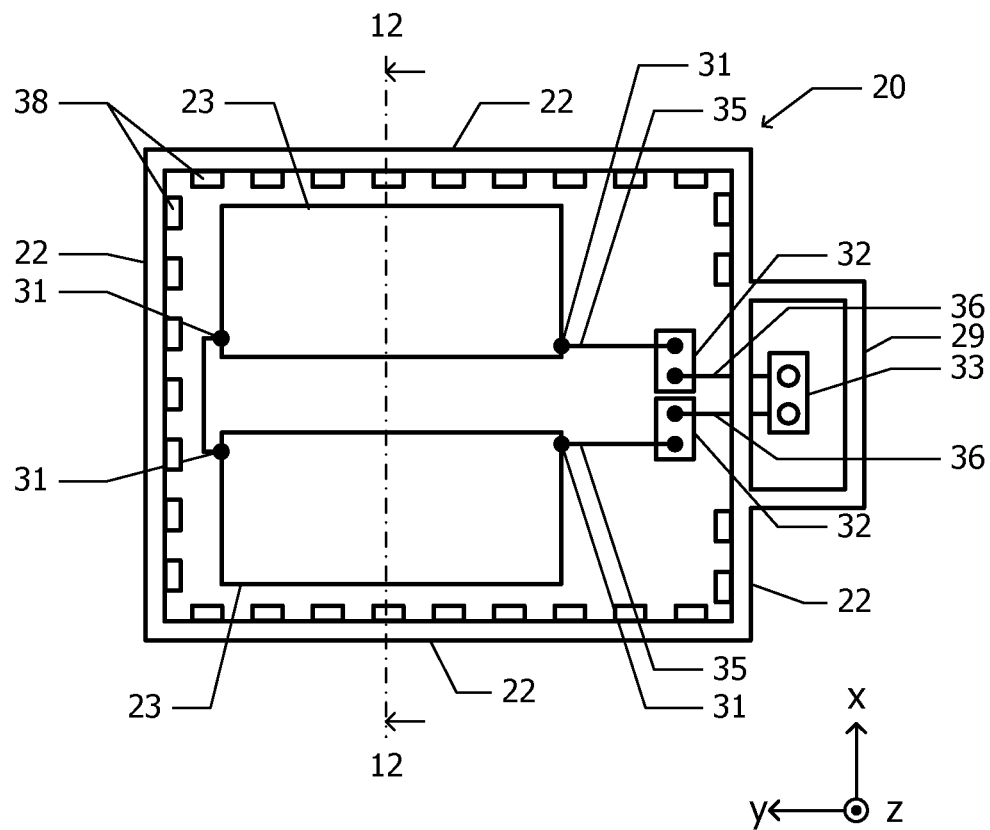

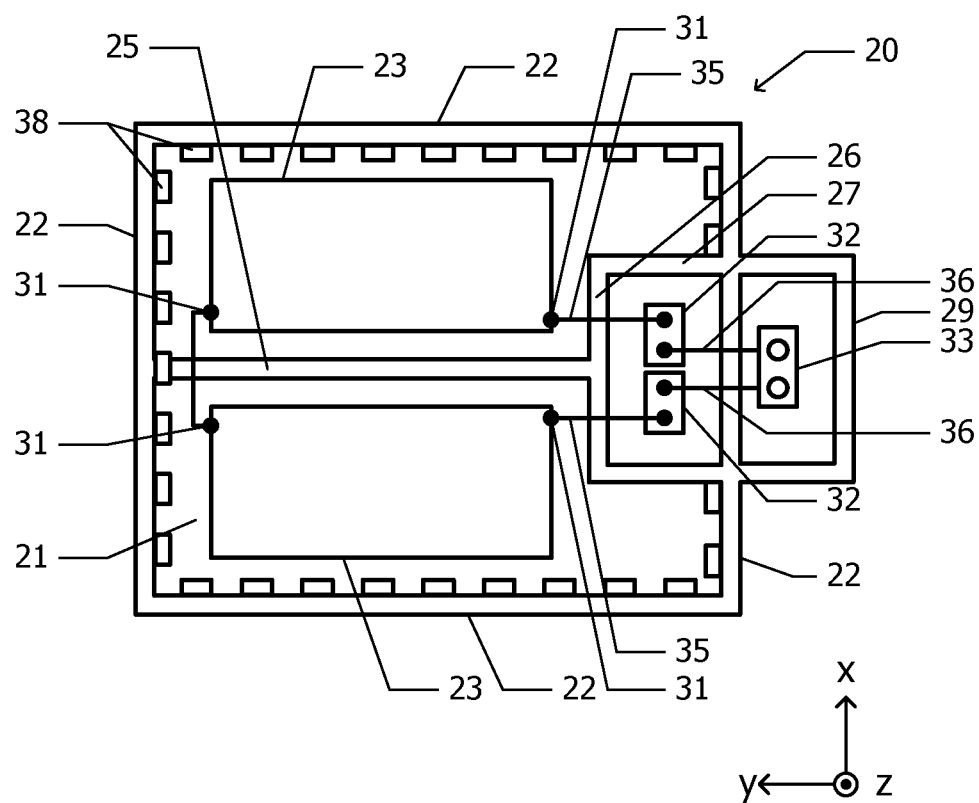

US 9,359,742 B2

SHOVEL

RELATED APPLICATIONS

Priority is claimed to Japanese Patent Application No. 2012-043182, filed Feb. 29, 2012, Japanese Patent Application No. 2012-043410, filed Feb. 29, 2012, and International Patent Application No. PCT/JP2013/053449, the entire content of each of which is incorporated herein by reference.

BACKGROUND

1. Technical Field

The present invention relates to a shovel on which a power storage device having power storage modules housed within a housing is mounted.

2. Description of Related Art

Power storage modules are well-known in which a plurality of plate-shaped power storage cells are stacked and the stacked power storage cells are connected in series. A heat transfer plate for cooling is inserted between the power storage cells. Pressurizing plates are arranged at both ends of a stacked body of the power storage cells and the heat transfer plates, and tie rods are passed through the two pressurizing plates. The tie rods apply a compressive force to the stacked body.

Two pairs of wall plates are arranged at the sides, top, and bottom of the stacked body. One pair of wall plates is thermally coupled with the heat transfer plates via end surfaces of the heat transfer plates to thereby absorb the heat of the heat transfer plates. The two pressurizing plates and the two pairs of wall plates are fixed with bolts to constitute a strong parallelepiped structure. This can enhance the shock resistance of the power storage modules.

SUMMARY

According to an embodiment of the present invention, there is provided a shovel including a power storage device; and an electrically driven part driven by discharged electric power from the power storage device. The power storage device includes a lower housing having a bottom panel and side panels; at least two power storage modules arranged at a distance from each other in a first direction on the bottom panel and configured to charge and discharge electrical energy; a first rib formed on the bottom panel of the lower housing, arranged between the two power storage modules, and configured to extend in a second direction intersecting in the first direction; and a second rib formed on the bottom panel of the lower housing, configured to extend in the first direction, and formed continuously with the first rib.

BRIEF DESCRIPTION OF THE DRAWINGS

FIG. 8A is a perspective view of the lower housing of the power storage device according to another embodiment, and FIG. 8B is a plan view of a lower housing and parts mounted on the lower housing in the power storage device according to the embodiment shown in FIG. 8A.

FIG. 9 is a plan view of the vicinity of a second rib of the power storage device according to the embodiment shown in FIGS. 8A and 8B.

FIG. 11 is a plan view of the lower housing and parts mounted thereon in the power storage device according to the embodiment shown in FIGS. 10A and 10B.

FIG. 16 is a plan view of a lower housing and parts mounted thereon in a power storage device according to the embodiment shown in FIGS. 15A and 15B.

DETAILED DESCRIPTION

Usually, electric circuit parts, such as a relay circuit, a fuse, and a safety switch, are connected to a power storage module. In order to utilize the power storage module and the electric circuit parts thereof as one functional unit, it is preferable to house the power storage module and the electric circuit parts within one housing. The parallelepiped structure of the power storage module described in the above BACKGROUND also has a function as a housing. Accordingly, if the power storage module of the parallelepiped structure is housed within the housing, the part that functions as the housing is redundant. Reduction in the number of parts is required for reduction in manufacturing costs and part costs. Particularly, in a shovel, a strong shock is applied to the power storage module during work, such as excavation. Moreover, it is necessary to arrange not only electrical components, such as the power storage module, but an engine, a hydraulic machine, or the like, within a cover of the shovel, and there is no enough space for installation. For this reason, it is desirable to enhance rigidity while suppressing enlargement of the power storage module.

In the following embodiments, the rigidity of the power storage device can be enhanced by providing the lower housing with the first rib and the second rib. Since sufficient rigidity can be ensured without preparing the parallelepiped structure housing the power storage module, the number of parts can be reduced.

Figure 1A:
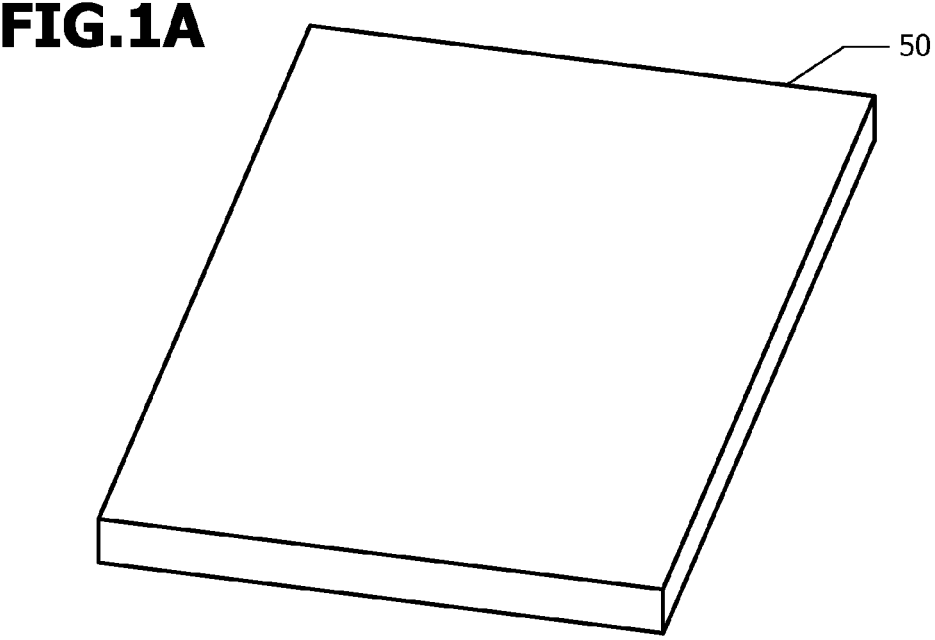
FIGS. 1A and 1B are respectively perspective views of a lid and a lower housing of a power storage device according to an embodiment.
Figure 1B:
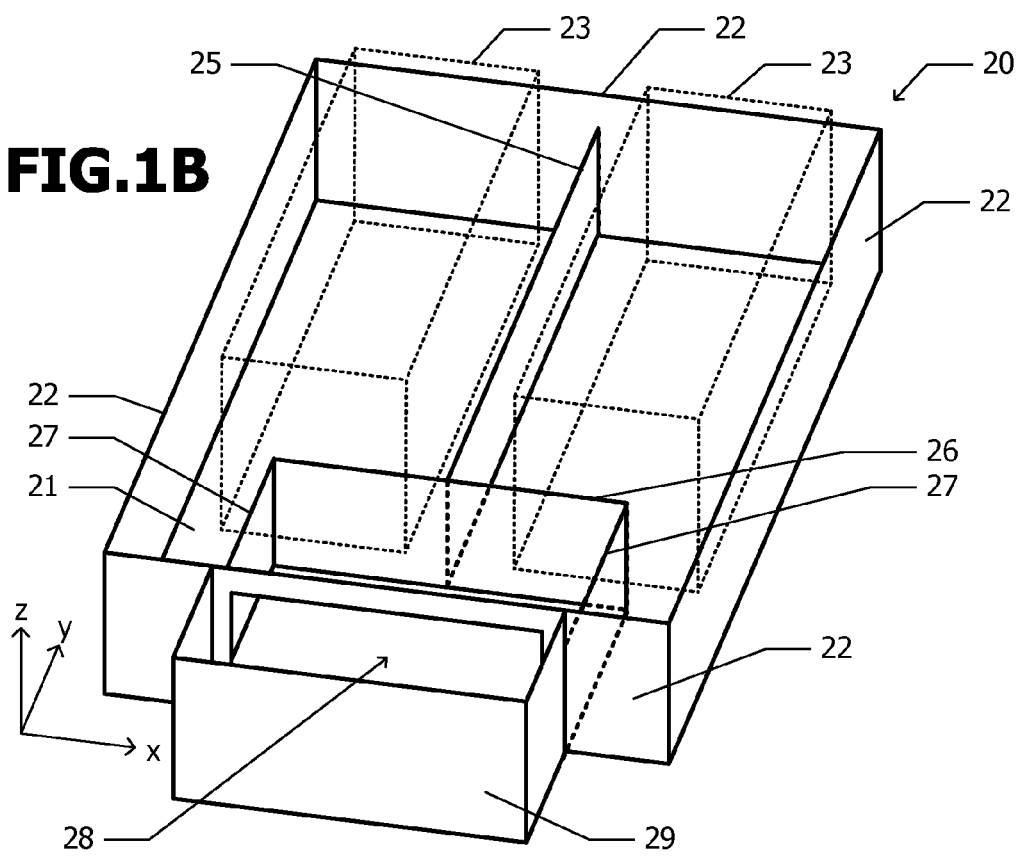

FIGS. 1A and 1B illustrate perspective views of a lid 50 and a lower housing 20 of a power storage device according to an embodiment, respectively. As illustrated in FIG. 1B, the lower housing 20 includes a bottom panel 21 and side panels 22 and has an opening portion that opens upward. The side panels 22 are arranged throughout an outer peripheral line of the bottom panel 21. The lid 50 illustrated in FIG. 1A closes the opening portion of the lower housing 20.

Two power storage modules 23 are mounted on the bottom panel 21. An xyz rectangular coordinate system having a plane parallel to the bottom panel 21 as an xy plane and a normal direction of the bottom panel 21 as a z direction is defined. A direction in which the two power storage modules 23 are separated from each other is defined as an x direction. Each of the power storage modules 23 includes a plurality of power storage cells that are stacked in a y direction, and performs the charging and discharging of electrical energy. The detailed configuration of the power storage module 23 will be described below with reference to FIGS. 3A and 3B.

One side panel 22 perpendicular to the y direction is provided with a connector box 29. A space within the connector box 29 and a space within the lower housing 20 communicate with each other via an opening 28. An upper opening portion of the connector box 29 is closed by a connector plate on which connector terminals are arranged.

A first rib 25, a second rib 26, and third ribs 27 for increasing rigidity are formed on the bottom panel 21. The first rib 25 is arranged between the two power storage modules 23, and extends in a direction (y direction) intersecting the x direction. One end portion of the first rib 25 is connected to the side panel 22 opposite to the side panel 22 provided with the connector box 29.

The second rib 26 is connected to the first rib 25, and extends in the x direction. The first rib 25 is connected to the second rib 26 at the center of the second rib 26. The third ribs 27 extend in the y direction from both ends of the second rib 26, and reach the side panel 22 provided with the connector box 29. The opening 28 is formed between points where the two third ribs 27 are connected to the side panel 22.

The first rib 25, the second rib 26, and the third ribs 27 are lower than the side panels 22, using the bottom panel 21 as a reference level. Gaps are formed between the first rib 25 and the lid 50, between the second rib 26 and the lid 50, and between the third ribs 27 and the lid 50 in a state where the opening portion of the lower housing 20 is closed with the lid 50.

The bottom panel 21, the side panels 22, the first rib 25, the second rib 26, the third ribs 27, and the connector box 29 are integrally molded by a casting process. As a material of these parts, for example, aluminum is used.

Figure 2:
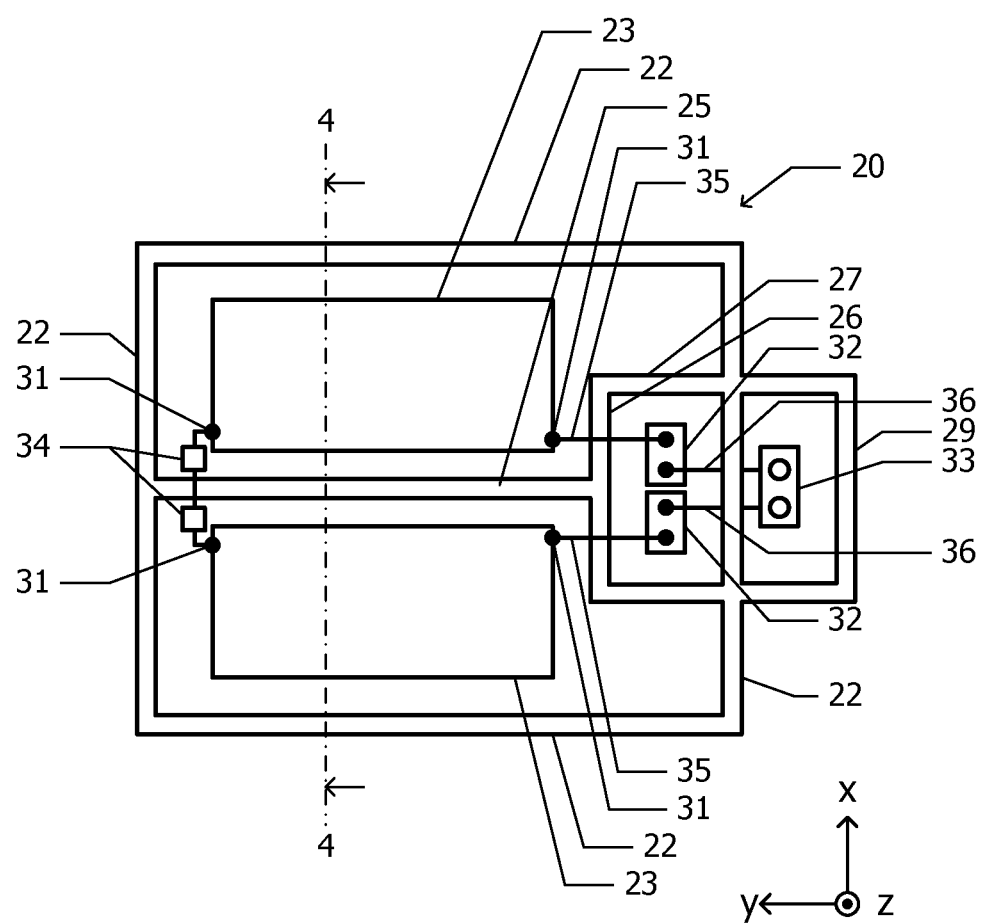
FIG. 2 is a plan view of the lower housing and parts mounted on the lower housing in the power storage device according to the embodiment shown in FIGS. 1A to 1B.

FIG. 2 illustrates a plan view of the lower housing 20 and parts mounted on the lower housing 20. The two power storage modules 23 are mounted at a distance from each other in the x direction. The first rib 25 passes in the y direction between regions where the two power storage modules 23 are mounted. One end portion of the first rib 25 is formed continuously with the side panel 22. The other end portion of the first rib 25 is laterally-located beyond the end portions of the power storage modules 23 about the y direction. The second rib 26 extends in the x direction from this end portion of the first rib 25. The second rib 26 partially overlaps each of the power storage modules 23 about the x direction. The third ribs 27 extend in the y direction from both ends of the second rib 26, and reach the side panel 22 provided with the connector box 29.

A pair of relay members 32 is arranged in a region surrounded by the second rib 26, the third ribs 27, and the connector box 29. A relay circuit 33 is arranged within the connector box 29. That is, the relay circuit 33 is mounted in a position separated in the y direction with respect to the power storage modules 23.

Each of the power storage modules 23 has terminals 31 at both ends in the y direction, respectively. Charging and discharging of the power storage modules 23 are performed through the terminals 31. The terminals 31 distant from the connector box 29 are electrically connected to each other via the electric-circuit parts 34 including a fuse, a safety switch, or the like.

The terminals 31 near the connector box 29 are electrically connected to the relay members 32 by bus bars 35, respectively. The bus bars 35 intersect the second rib 26. The relay members 32 are connected to the relay circuit 33 by the bus bars 36. The bus bars 36 pass through the opening 28 (FIG. 1B).

Figure 3A:
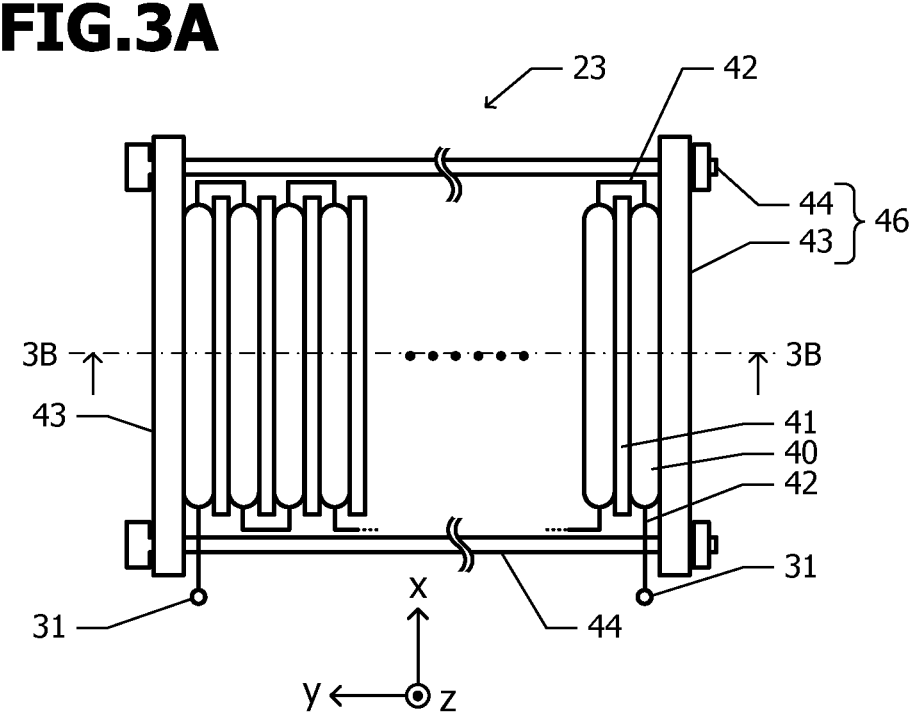
FIG. 3A is a plan view of a power storage module of the power storage device according to the embodiment shown in FIGS. 1A to 1B.

FIG. 3A illustrates a plan view of a power storage module 23. The plurality of plate-shaped power storage cells 40 and a plurality of heat transfer plates 41 are alternately stacked in the thickness direction (y direction). Instead, one heat transfer plate 41 may be arranged with respect to a plurality of, for example, two power storage cells 40. A pair of electrode tabs 42 is led out from each of the power storage cells 40. The pair of electrode tabs 42 is led out in the x direction in mutually opposite directions. The plurality of power storage cells 40 are connected in series by connecting the electrode tabs 42 of the power storage cells 40 which are adjacent to each other. The electrode tabs 42 of the power storage cells 40 at both ends are connected to the two terminals 31 of the power storage modules 23, respectively.

A pressurizing mechanism 46 applies a compressive force in a stacking direction to a stacked structure in which the power storage cells 40 and the heat transfer plates 41 are stacked. The pressurizing mechanism 46 includes pressurizing plates 43 arranged at both ends of the stacked structure, and a plurality of tie rods 44 that extend from one pressurizing plate 43 to the other pressurizing plate 43. By tightening the tie rods 44 with nuts, the compressive force in the stacking direction can be applied to the stacked structure of the power storage cells 40 and the heat transfer plates 41.

Figure 3B:
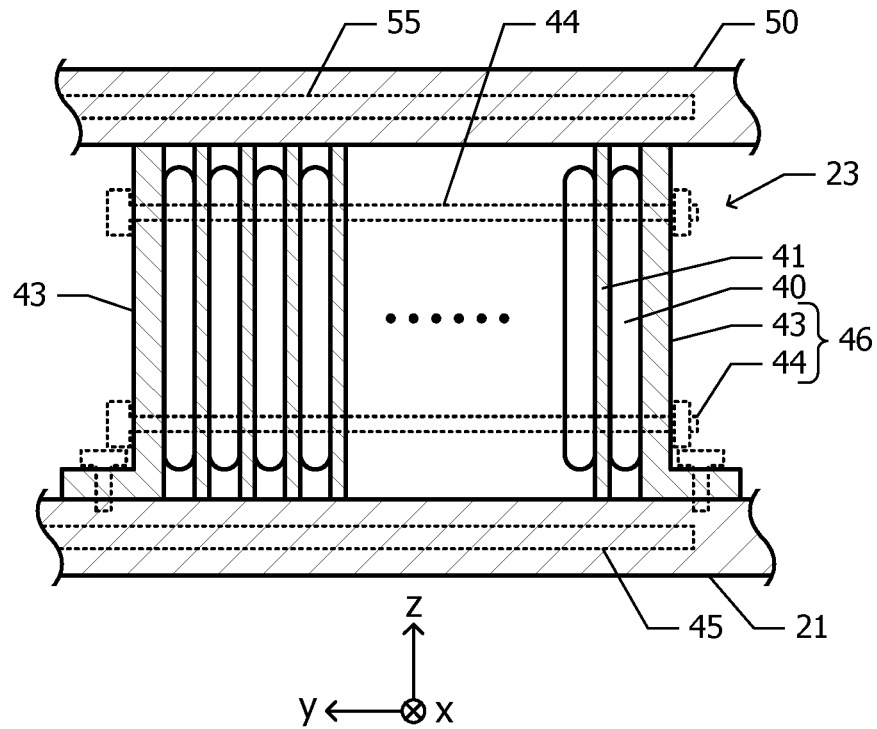
FIG. 3B is a cross-sectional view taken along one-dot chain line 3B-3B of FIG. 3A.

FIG. 3B illustrates a cross-sectional view taken along one-dot chain line 3B-3B of FIG. 3A. The pressurizing plates 43 are screw-locked to the bottom panel 21 of the lower housing 20. Lower ends of the heat transfer plates 41 come into contact with the bottom panel 21, and upper ends thereof come into contact with the lid 50. The lid 50 is tightened and fixed to the lower housing 20 with bolts or the like, and the compressive force in the z direction is applied to the heat transfer plates 41. The power storage module 23 is firmly and unslidably fixed within a housing including the lower housing 20 (FIG. 1B) and the lid 50 (FIG. 1A) by this compressive force.

A flow passage 45 for a cooling medium is formed within the bottom panel 21, and a flow passage 55 for a cooling medium is also formed within the lid 50. The power storage cells 40 can be cooled via the heat transfer plates 41 by allowing a cooling medium, for example, cooling water, to flow through the flow passages 45 and 55.

Figure 4:
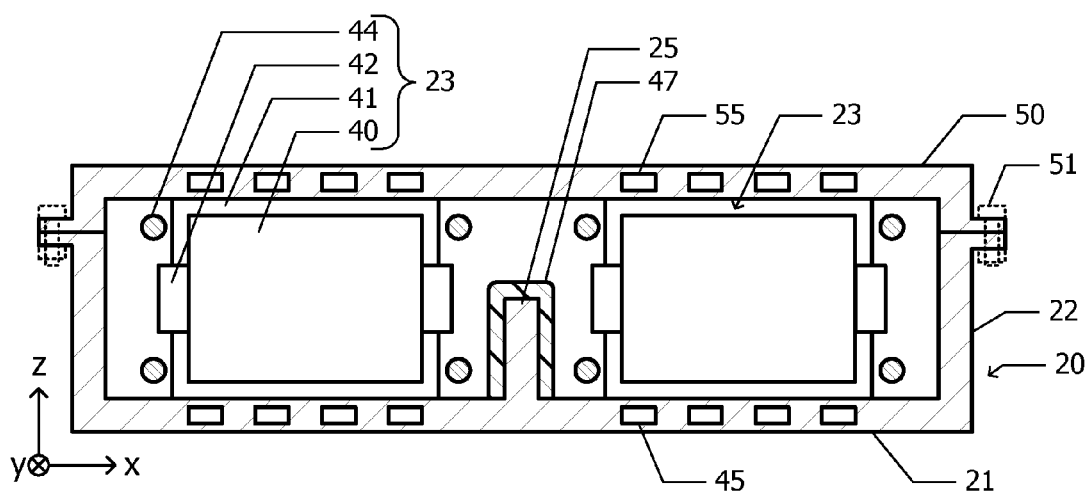
FIG. 4 is a cross-sectional view taken along one-dot chain line 4-4 of FIG. 2.

FIG. 4 illustrates a cross-sectional view taken along one-dot chain line 4-4 of FIG. 2. The lower housing 20 is constituted by the bottom panel 21 and the side panels 22. The first rib 25 is formed substantially at the center of the bottom panel 21 about the x direction. The power storage modules 23 are mounted on both sides of the first rib 25. The lid 50 blocks the opening portion of the lower housing 20. The lid 50 is fixed to the lower housing 20 by fasteners 51, such as a bolt and a nut. The flow passage 45 is formed inside the bottom panel 21, and the flow passage 55 is formed inside the lid 50.

The surface of the first rib 25 is covered with an insulating film 47. For example, an insulating resin film is used for the insulating film 47. Since the lower housing 20 and the lid 50 apply the compressive force in the z direction to the heat transfer plates 41, the two power storage modules 23 are fixed within the housing. However, if a larger shock than allowable is applied to the housing, the power storage modules 23 may deviate in directions parallel to the xy plane. The first rib 25 and the insulating film 47 prevent the two power storage modules 23 from coming into contact with each other and being electrically short-circuited, even if the power storage modules 23 deviate.

Figure 5A:
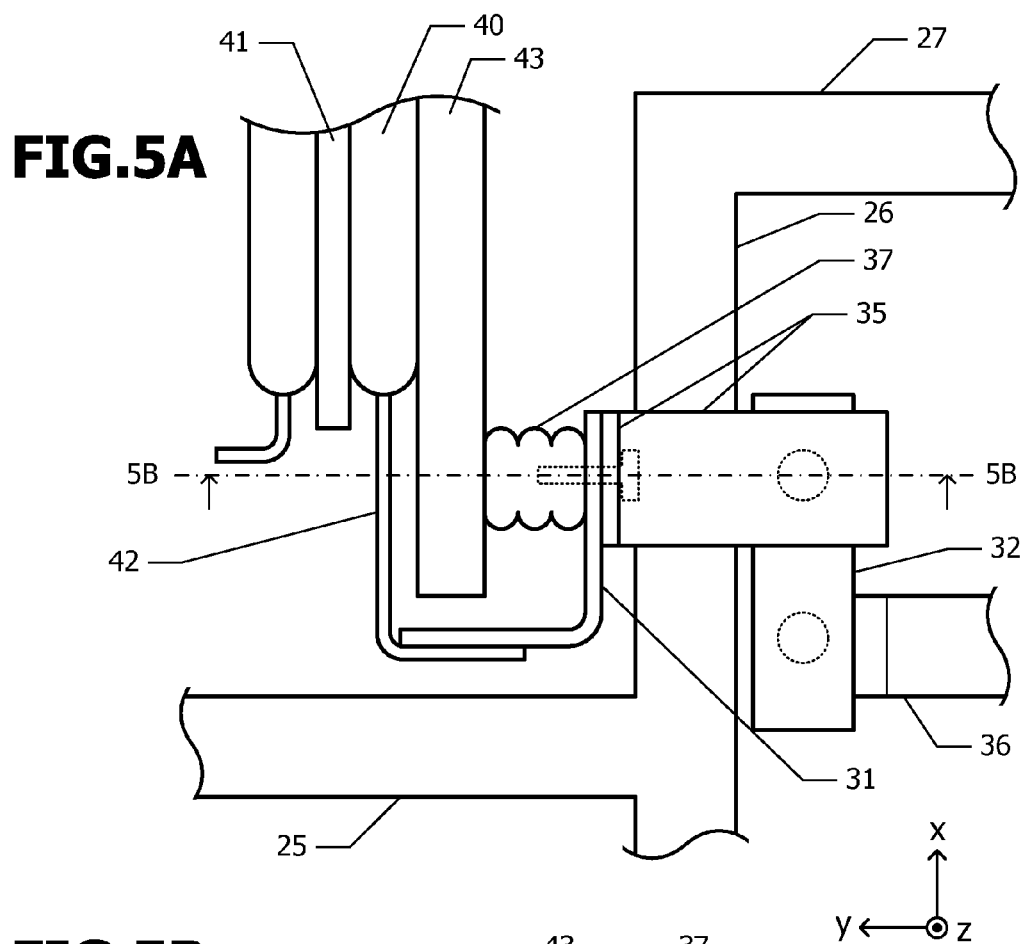
FIG. 5A is a plan view of the vicinity of one terminal of the power storage module mounted on the power storage device according to the embodiment shown in FIGS. 1A to 1B.
Figure 5B:
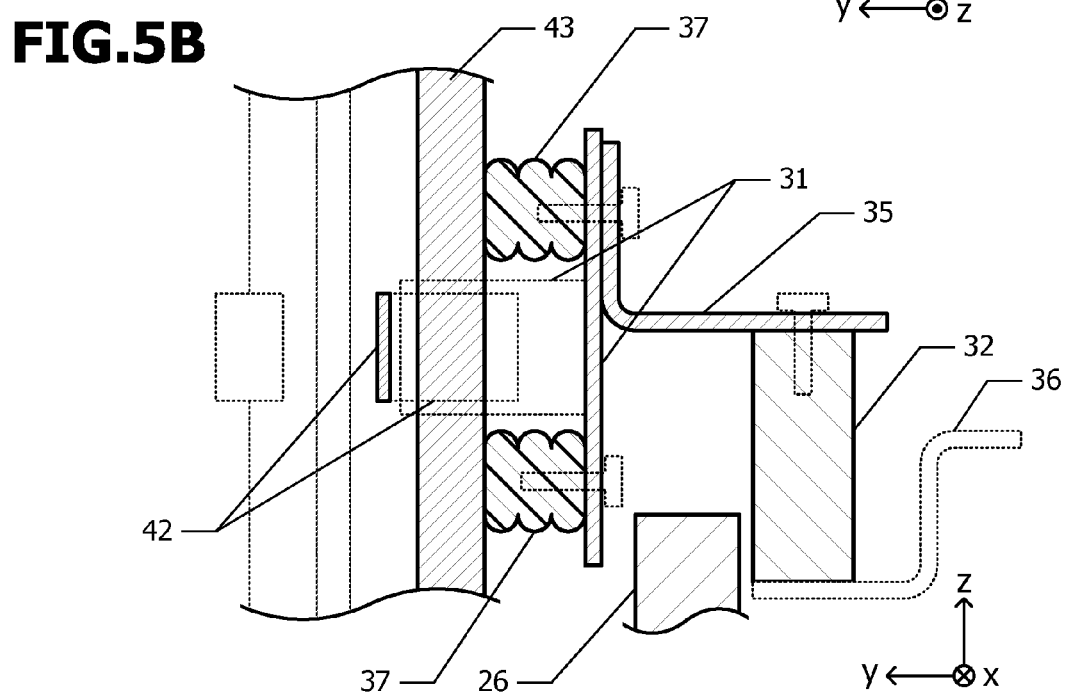
FIG. 5B is a cross-sectional view taken along one-dot chain line 5B-5B of FIG. 5A.

FIG. 5A illustrates a plan view of a connection point of the power storage module 23 and the relay member 32 (FIG. 2). FIG. 5B illustrates a cross-sectional view taken along one-dot chain line 5B-5B of FIG. 5A. Insulators 37 are attached to an outside surface of the pressurizing plate 43. Both the terminal 31 and the bus bar 35 are tightened to the insulators 37. In addition, only the terminal 31 is fixed to the bottom insulator 37 illustrated in FIG. 5B. The terminal 31 is connected to one electrode tab 42 of the power storage cell 40 arranged on the outermost side. The bus bar 35 intersects the second rib 26 in a plan view and is connected to the relay member 32. The bus bar 35 is arranged at the position higher than a top end surface of the second rib 26. In addition, the bus bar 35 is arranged at a position lower than a top end surface of the side panel 22 (FIG. 4).

The bus bar 36 is connected to the relay member 32. The bus bar 36 is connected to the relay circuit 33 (FIG. 2). Since the second rib 26 is lower than the side panel 22 (FIG. 4), a space through which the bus bar 35 can pass is ensured above the second rib 26. The first rib 25 and the third ribs 27 (FIG. 1B, FIG. 5A) also have the same height as the second rib 26. If the first rib 25 is made to have the same height as the side panels 22, some kinds of work in a space in the vicinity of the bottom panel 21 become difficult in a state where the power storage module 23 is mounted. By making the first rib 25 lower than the side panels 22, the workability in the state where the power storage module 23 is mounted can be enhanced. In order to ensure sufficient workability, it is preferable to make the height of the first rib 25 equal to or less than ⅔ of the height of the side panels 22.

If the first rib 25 is made low, there is a concern that the rigidity of the lower housing decreases (natural frequency decreases). Next, simulation results of the relationship between the height of the first rib 25 and the natural frequency of the lower housing 20 will be described.

Figure 6A:
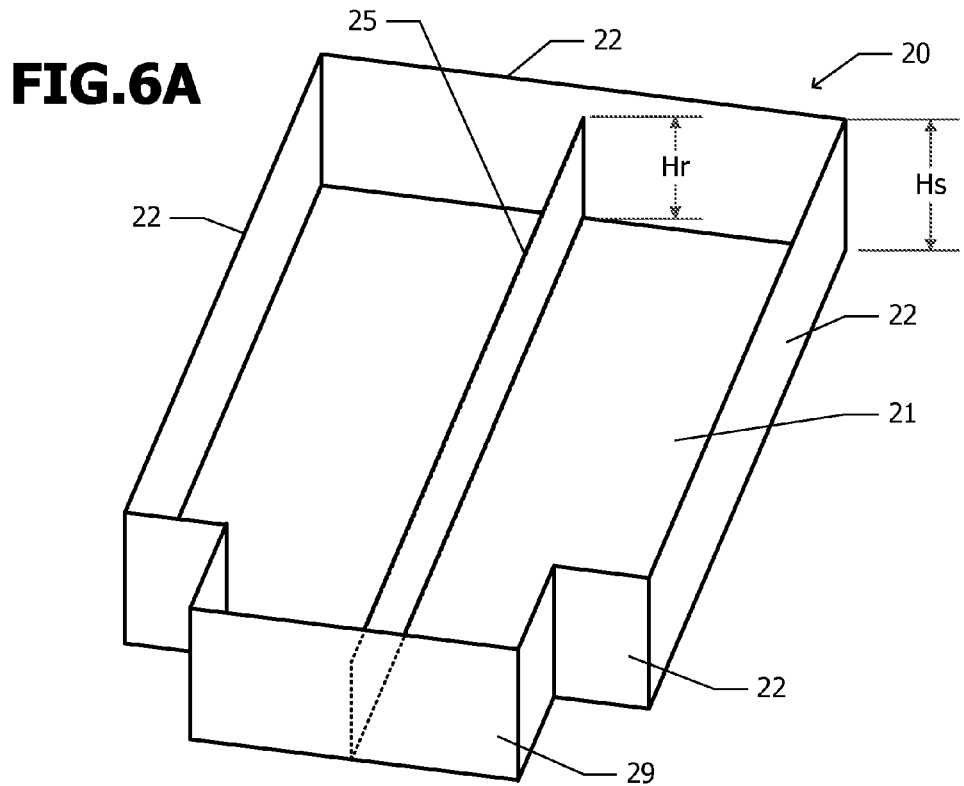
FIG. 6A is a perspective view of the lower housing that is a target to be simulated.

FIG. 6A illustrates a perspective view of the lower housing 20 that is a target to be simulated. The lower housing 20 that is a target to be simulated has the bottom panel 21, the side panels 22, the connector box 29, and the first rib 25. The second rib 26 and the third ribs 27 that are illustrated in FIG. 1B are omitted. Instead, the first rib 25 extends from one side panel 22 to the opposite side panel of the connector box 29. A primary natural frequency is obtained by the simulation in terms of various ratios (Hr/Hs) of a height Hr of the first rib 25 to a height Hs of the side panel 22.

Figure 6B:
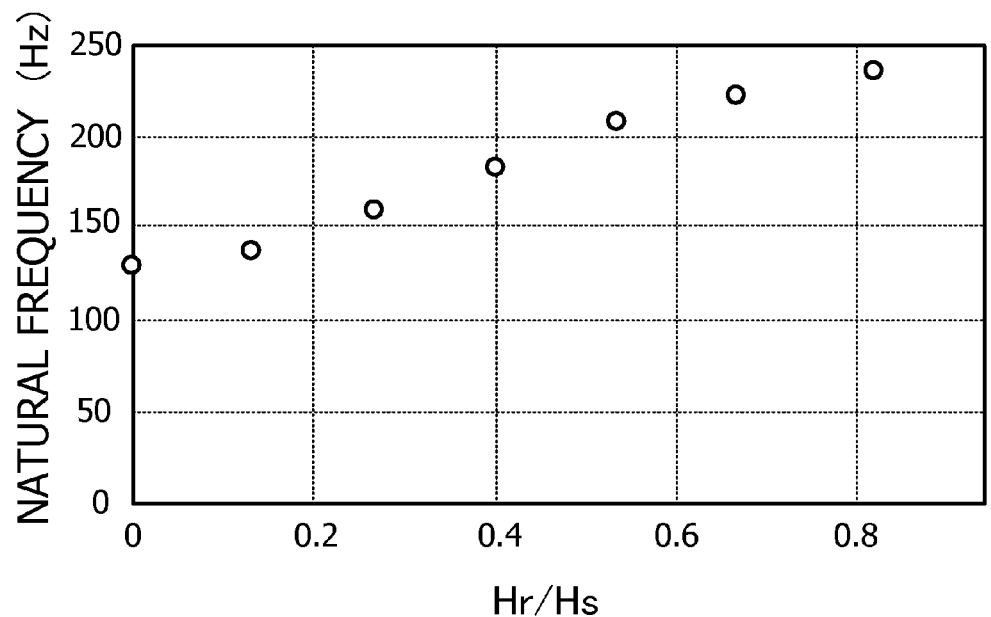
FIG. 6B is a graph illustrating simulation results of the relationship between the height of ribs and a natural frequency.

FIG. 6B illustrates simulation results. A horizontal axis represents the Hr/Hs, and a vertical axis represents the primary natural frequency in units of "Hz". Even if the height Hr of the first rib 25 is made as low as about ⅔ of the height Hs of the side panels 22, sufficiently high natural frequency is realized compared to a case where no rib is formed. Additionally, in order to obtain sufficient effects of providing the rib, it is preferable to make the height Hr of the first rib 25 equal to or greater than ¼ of the height Hs of the side panels 22.

As illustrated in FIGS. 3B and 4, the power storage modules 23 are placed and fixed between the lower housing 20 and the lid 50, in a state where the power storage modules 23 are mounted on the lower housing 20 and the opening portion of the lower housing 20 is closed with the lid 50. For this reason, the power storage modules 23 serve to enhance the rigidity of the power storage device. An effect of enhancing the rigidity by the power storage modules 23 does not affect the region where the relay members 32 (FIG. 2) are mounted. The rigidity of the entire region can be enhanced by providing the second rib 26 in this region. In order to obtain a sufficient rigidity enhancing effect, it is preferable to arrange the second rib 26 so that the second rib 26 partially overlaps the power storage modules 23 about the x direction.

In the embodiment shown in FIGS. 1A to 5B, the lower housing 20 (FIG. 1B) and the lid 50 (FIG. 1A) firmly fix the power storage modules 23. A parallelepiped structure for enhancing rigidity is not prepared for each of the power storage modules 23. For this reason, the number of parts of the power storage device can be reduced.

Figure 7A:
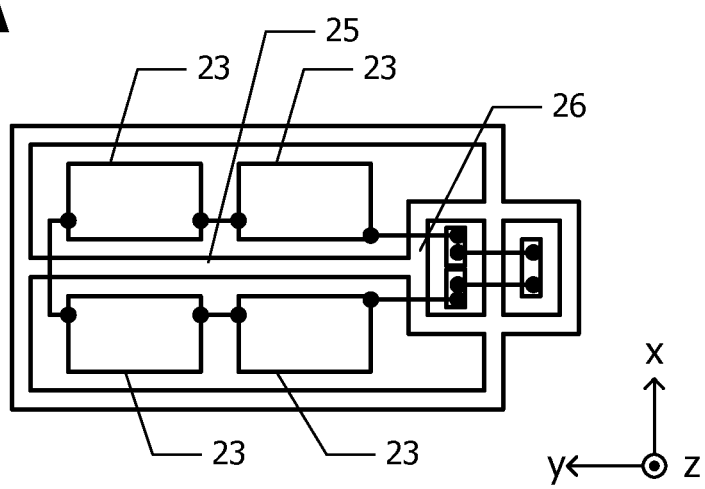
FIGS. 7A and 7B are perspective views of a lower housing and parts mounted thereon in a power storage device according to modifications of the embodiment shown in FIGS. 1A to 5B.
Figure 7B:
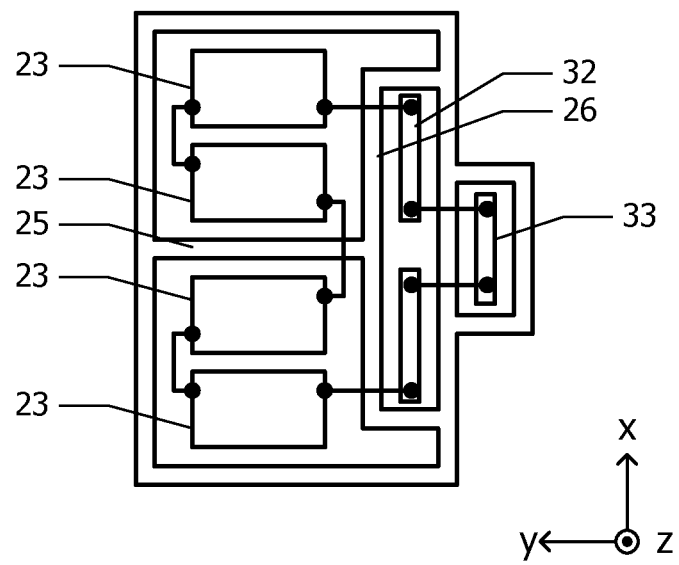

In the above embodiment, although the two power storage modules 23 are mounted on one lower housing 20, three or more than three power storage modules 23 may be mounted. For example, as illustrated in FIG. 7A, a total of four power storage modules 23 by arranging two power storage modules 23 in the x direction and arranging two power storage modules 23 in the y direction may be mounted and connected in series. Moreover, as illustrated in FIG. 7B, four power storage modules 23 may be arranged in the x direction and connected in series. In this case, it is preferable to arrange the first rib 25 between two central power storage modules 23. Moreover, a rib may be arranged between the other power storage modules 23.

FIG. 8A illustrates a schematic perspective view of a lower housing of a power storage device according to another embodiment. The configuration of the bottom panel 21, the side panels 22, and the connector box 29 is the same as the configuration of those of the lower housing 20 of the embodiment shown in FIG. 1B. In this embodiment shown in FIG. 8A, the first rib 25 extends from the side panel 22 opposite to the side panel 22 provided with the connector box 29 to the side panel of the connector box 29. Moreover, a second rib 60 intersecting the first rib 25 is arranged. The bottom panel 21, the side panels 22, the connector box 29, and the second rib 60 are integrally molded by the casting process.

The second rib 60 extends to the side panels 22 on both sides parallel to the first rib 25. The second rib 60 has the same height as the first rib 25 in the vicinity of a point of intersection with the first rib 25. The other portions of the second rib 60 are higher than the side panels 22.

In the embodiment shown in FIG. 8A, the second rib 26 (FIG. 1B) and the third ribs 27 (FIG. 1B) of the embodiment shown in FIGS. 1A to 5B are not formed. In addition, ribs corresponding to the second rib 26 and the third ribs 27 of the embodiment shown in FIGS. 1A to 5B may be formed in this embodiment shown in FIG. 8A.

FIG. 8B illustrates a plan view of the lower housing 20 and parts mounted on the lower housing 20 in the power storage device according to the embodiment shown in FIG. 8A. In the following description, description of an identical configuration to the configuration (FIG. 2) of the embodiment shown in FIGS. 1A to 5B will be omitted. The power storage modules 23 are mounted on both sides of the first rib 25. Each of the power storage modules 23 is arranged so as to intersect the second rib 60.

FIG. 9 illustrates a plan view of the lower housing 20 and the power storage modules 23. Each of the power storage modules 23 includes the plurality of power storage cells 40 and the plurality of heat transfer plates 41 that are alternately stacked. The second rib 60 is arranged between the power storage cells 40 which are adjacent to each other. The tie rods extend from one pressurizing plate 43 to the other pressurizing plate 43 passing through the second rib 60. The pressurizing mechanism 46 including the pressurizing plates 43 and the tie rods 44 applies a compressive force to the stacked structure including the power storage cells 40 and the heat transfer plates 41, and the second rib 60.

The second rib 60 is formed with through-holes 65 through which the tie rods 44 pass. Moreover, the second rib 60 is formed with through-holes 66 for connecting the electrode tabs 42 of the power storage cells 40 arranged on both sides of the second rib 60. Through-holes 61 are formed at intersection points between extension lines of the tie rods 44 and the side panel 22. During the assembly of the power storage device, the tie rods 44 can be inserted into the lower housing 20 through the through-holes 61. The through-holes 61 are closed with lids 62 after the assembly.

In the embodiment shown in FIGS. 8A to 9, the first rib 25 and the second rib 60 can also enhance the rigidity of the power storage device. Moreover, since the compressive force is applied to the second rib 60 together with the stacked structure including the power storage cells 40 and the heat transfer plates 41 by the pressurizing mechanism 46, the power storage modules 23 can be more firmly fixed within the housing.

Figure 10A:
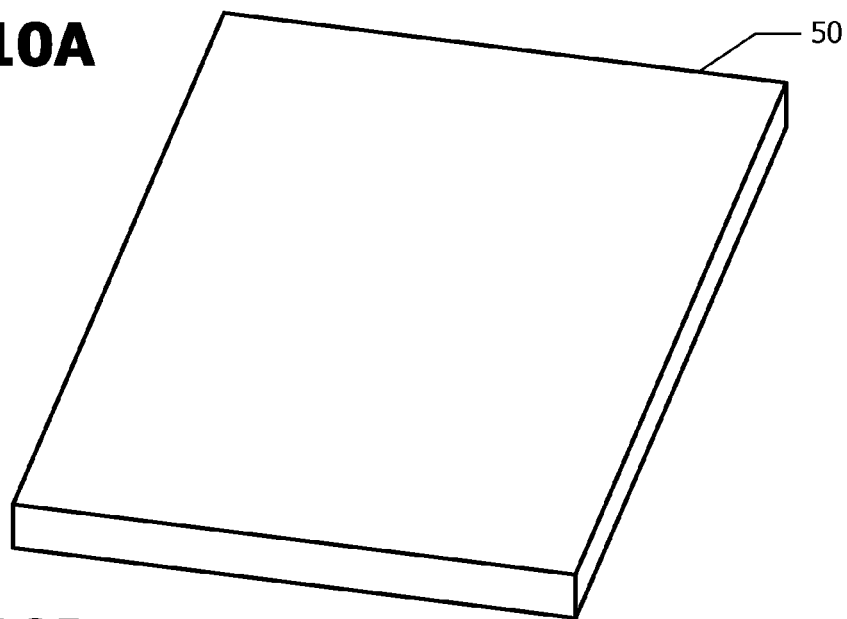
FIGS. 10A and 10B are respectively perspective views of a lid and a lower housing of a power storage device according to further another embodiment.
Figure 10B:
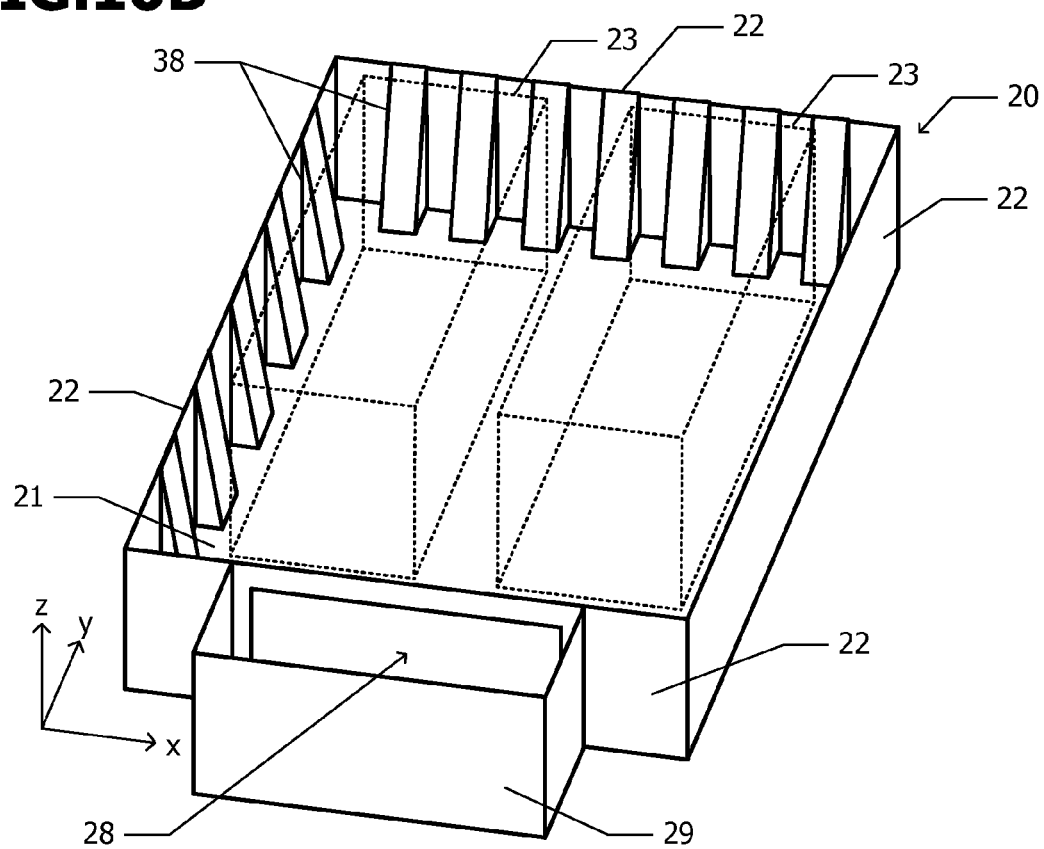

FIGS. 10A and 10B illustrate perspective views of the lid 50 and the lower housing 20 of a power storage device according to further another embodiment, respectively. As illustrated in FIG. 10B, the lower housing 20 includes the bottom panel 21 and the side panels 22 and has the opening portion that opens upward. The side panels 22 are arranged throughout the outer peripheral line of the bottom panel 21. The lid 50 illustrated in FIG. 10A closes the opening portion of the lower housing 20.

The two power storage modules 23 are mounted on the bottom panel 21. The xyz rectangular coordinate system having the plane parallel to the bottom panel 21 as the xy plane and the normal direction of the bottom panel 21 as the z direction is defined. The direction in which the two power storage modules 23 are separated from each other is defined as the x direction. Each of the power storage modules 23 includes the plurality of power storage cells that are stacked in the y direction, and performs the charging and discharging of electrical energy. The detailed configuration of the power storage module 23 is the same as the configuration of the power storage module 23 (FIGS. 3A and 3B) mounted on the power storage device according to the embodiment shown in FIGS. 1A to 5B.

One side panel 22 perpendicular to the y direction is provided with the connector box 29. The space within the connector box 29 and the space within the lower housing 20 communicate with each other via the opening 28. The upper opening portion of the connector box 29 is closed by the connector plate on which the connector terminals are arranged.

A plurality of side panel ribs 38 are provided on inside surfaces of the side panels 22. Each of the side panel ribs 38 is in contact with the bottom panel 21, and extends upward from the bottom panel 21. The side panel ribs 38 are discretely arranged in the circumferential direction along the outer peripheral line of the bottom panel 21. The inwardly-directed surface of each of the side panel ribs 38 inclines so that the side panel ribs 38 become thinner from the bottom panel 21 toward the upside.

Although the regions of the side panels 22 between the side panel ribs 38 adjacent to each other do not have thickness in FIG. 10B, the regions have a certain thickness in practice. The side panels 22 in the regions between the side panel ribs 38 have uniform thickness in a height direction. That is, the inside surfaces of the side panels 22 in the regions where the side panel ribs 38 are not formed are perpendicular to the bottom panel 21.

Additionally, although an example in which the surfaces of the side panel ribs 38 incline in the entire region in the height direction is illustrated in FIG. 10B, the surfaces of the side panel ribs 38 may not necessarily incline in the entire region. For example, a part of the inwardly-directed surface of each side panel rib 38, the part being in contact with the bottom panel 21, may be inclined, and upper part may be made to be perpendicular to the bottom panel 21.

The bottom panel 21, the side panels 22, the side panel ribs 38, and the connector box 29 are integrally molded by the casting process. As a material of these parts, for example, aluminum is used.

FIG. 11 illustrates a plan view of the lower housing 20 and parts mounted on the lower housing 20. The two power storage modules 23 are arranged at a distance from each other in the x direction. The plurality of side panel ribs 38 are provided on the inside surfaces of the side panels 22. The plurality of side panel ribs 38 are discretely arranged in the circumferential direction over the entire region of an outer periphery of the bottom panel 21, except for the portion to which the connector box 29 is attached.

The pair of relay members 32 is arranged between the power storage modules 23 and the connector box 29. The relay circuit 33 is arranged within the connector box 29.

Each of the power storage modules 23 has the terminals 31 at both ends in the y direction, respectively. The charging and discharging of the power storage modules 23 are performed through the terminals 31. The terminals 31 distant from the connector box 29 are electrically connected to each other. This pair of terminals 31 may be connected via a fuse.

The terminals 31 near the connector box 29 are electrically connected to the relay members 32 by the bus bars 35, respectively. The relay members 32 are connected to the relay circuit 33 by the bus bars 36. The bus bars 36 pass through the opening 28 (FIG. 10B).

Figure 12:
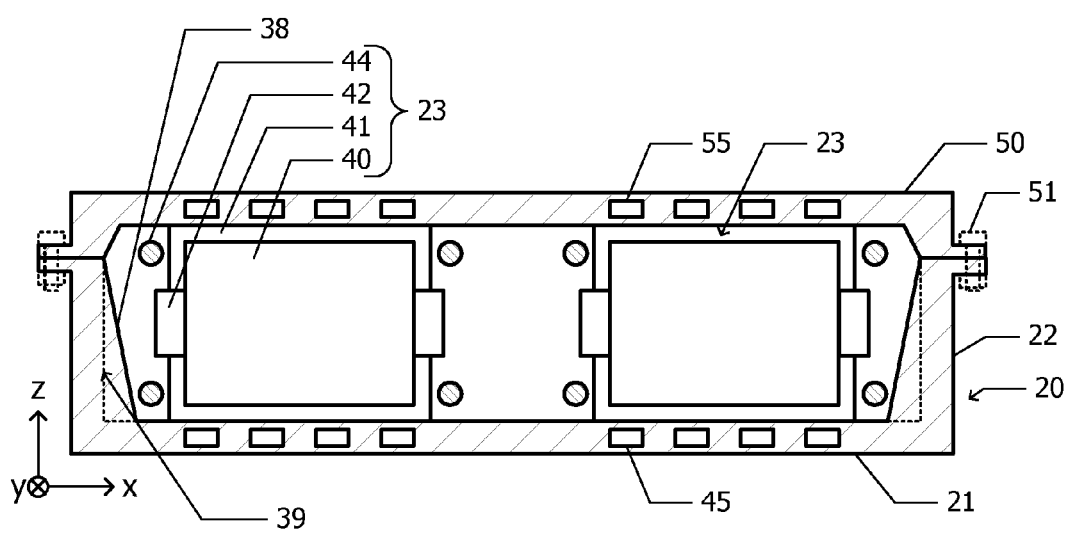
FIG. 12 is a cross-sectional view taken along one-dot chain line 12-12 of FIG. 11.

FIG. 12 illustrates a cross-sectional view taken along one-dot chain line 12-12 of FIG. 11. The lower housing 20 is constituted by the bottom panel 21 and the side panels 22. The two power storage modules 23 are arranged at a distance from each other in the x direction on the bottom panel 21. The lid 50 closes the opening portion of the lower housing 20. The lid 50 is fixed to the lower housing 20 by the fasteners 51, such as a bolt and a nut. The flow passage 45 is formed inside the bottom panel 21, and the flow passage 55 is formed inside the lid 50.

The side panel ribs 38 are formed on the inside surfaces of the side panels 22. The inwardly-directed surfaces of the side panel ribs 38 incline. Inside surfaces 39 of the side panels 22 are substantially perpendicular to the bottom panel 21, in the regions where the side panel ribs 38 are not provided.

Figure 13A:
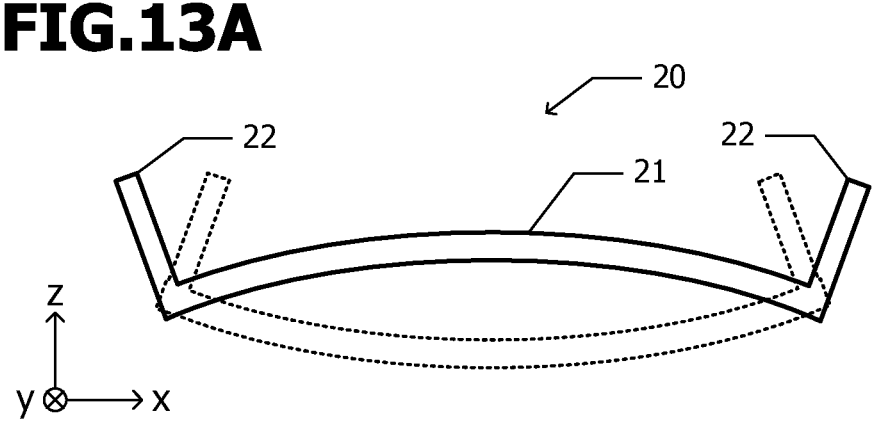
FIGS. 13A and 13B are respectively views illustrating a primary natural frequency mode of a lower housing on which no rib is formed, and a primary natural frequency mode of a lower housing on which ribs are formed.
Figure 13B:
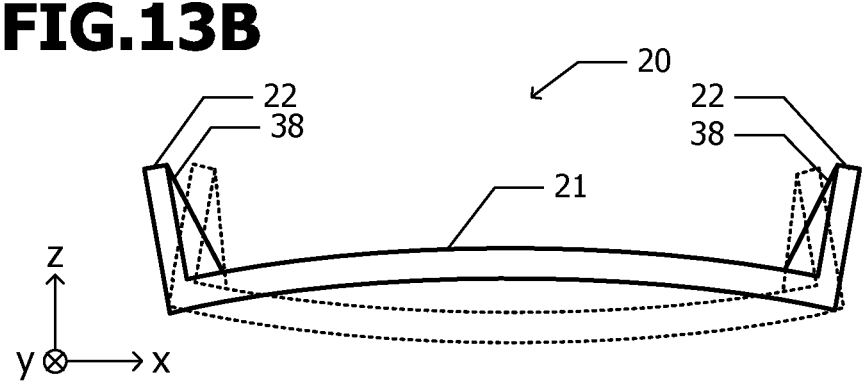

FIGS. 13A and 13B illustrate the primary natural frequency mode of the lower housing 20. No rib is provided on the side panels 22 in the lower housing 20 illustrated in FIG. 13A. The side panel ribs 38 are provided on the side panels 22 in the lower housing 20 illustrated in FIG. 13B. In the primary natural frequency mode, the bottom panel 21 vibrates so that the center of the bottom panel 21 corresponds to an antinode and the connection points between the bottom panel 21 and the side panels 22 correspond to nodes. The inclination of the bottom panel 21 with respect to the xy plane is at a maximum at positions of nodes of a vibration mode. The side panel ribs 38 act so that fluctuations of the inclination of the bottom panel 21 at the positions of the nodes are suppressed. For this reason, the natural frequency of the lower housing 20 can be made high, that is, the rigidity thereof can be enhanced.

In order to suppress the fluctuations of the inclination at the positions of the nodes of the bottom panel 21, it is preferable to thicken the side panel ribs 38 at the points of connection with the bottom panel 21. Even if the side panel ribs 38 are thickened in the vicinity of the upper ends of the side panels 22, the effect of making the natural frequency high is low compared to a case where the side panel ribs 38 are thickened at the connection points to the bottom panel 21. Accordingly, it is preferable to incline the inwardly-directed surfaces of the side panel ribs 38 so that the side panel ribs 38 become thin upward from the bottom panel 21. The weight of the lower housing 20 can be reduced by inclining the inwardly-directed surfaces of the side panel ribs 38.

Additionally, in the embodiment shown in FIGS. 10A to 12, as illustrated in FIG. 11, the side panel ribs 38 are discretely arranged in the circumferential direction along the outer peripheral line of the bottom panel 21. Accordingly, weight can be reduced compared to a structure where the whole side panels 22 are thickened to the same degree as the side panel ribs 38.

In the embodiment shown in FIGS. 10A to 12, as illustrated in FIG. 12, the power storage modules 23 are firmly fixed within the housing by the lower housing 20 and the lid 50. For this reason, sufficient rigidity of the power storage device can be ensured without adopting the parallelepiped structure for ensuring the rigidity of each power storage module 23. Accordingly, the number of parts can be reduced while ensuring the rigidity.

Figure 14A:
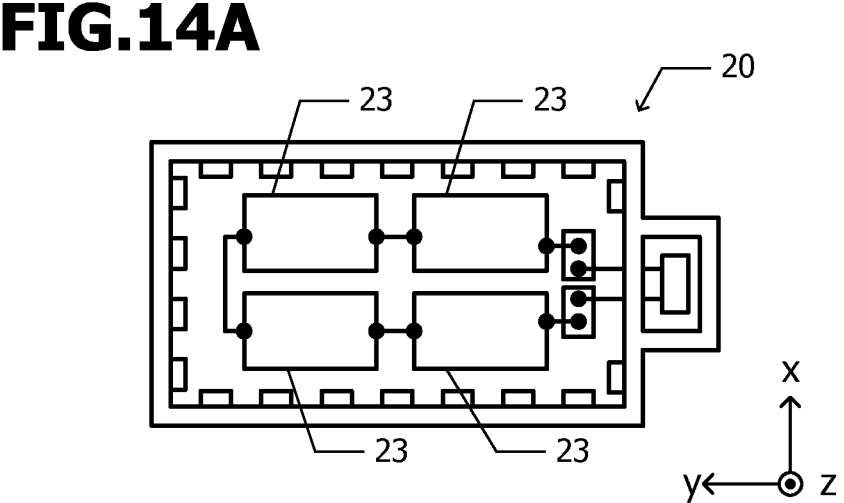
FIGS. 14A and 14B are plan views of a lower housing of a power storage device and parts mounted thereon according to modifications of the embodiment shown in FIGS. 10A to 12.
Figure 14B:
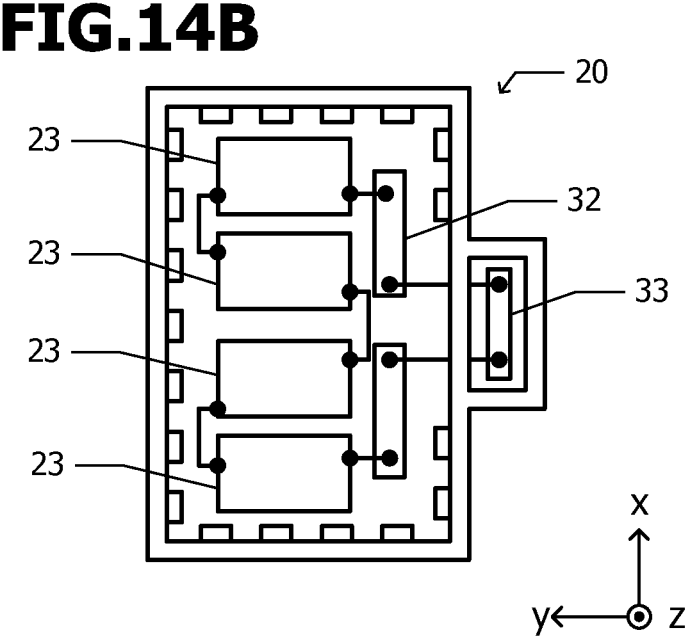

In the above embodiment shown in FIGS. 10A to 12, as illustrated in FIG. 11, the two power storage modules 23 are mounted on the one lower housing 20. However, the number of the power storage modules 23 is not limited to two. As illustrated in FIGS. 14A and 14B, four power storage modules 23 may be mounted on one lower housing 20.

In an example illustrated in FIG. 14A, a total of four power storage modules 23 are mounted in such a manner that the four power storage modules 23 are arranged in a two-by-two matrix shape in the x direction and y direction. Four power storage modules 23 are lined up in the x direction in an example illustrated in FIG. 14B. In both of the power storage devices of FIGS. 14A and 14B, the four power storage modules 23 are connected in series. Moreover, five or more than five power storage modules may be mounted on one lower housing 20.

Figure 15A:
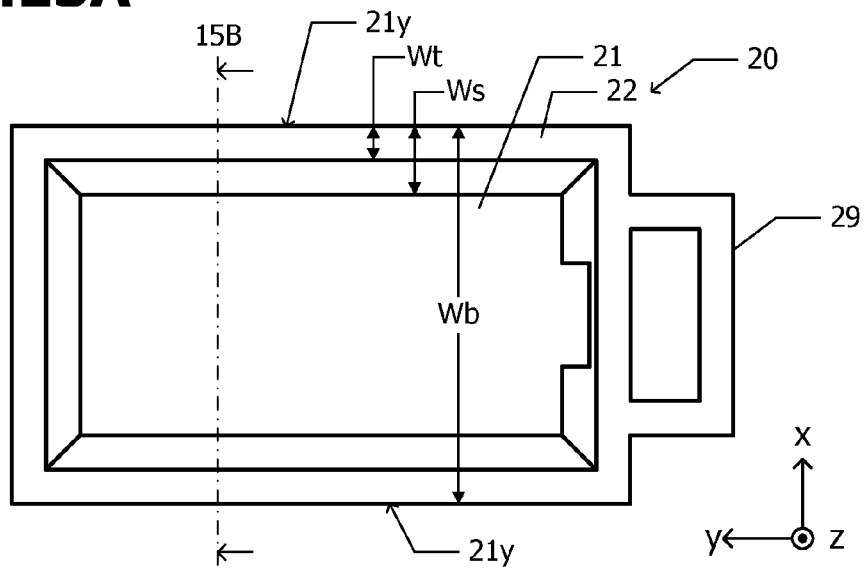
FIG. 15A is a plan view of a lower housing of a power storage device according to still further another embodiment.
Figure 15B:
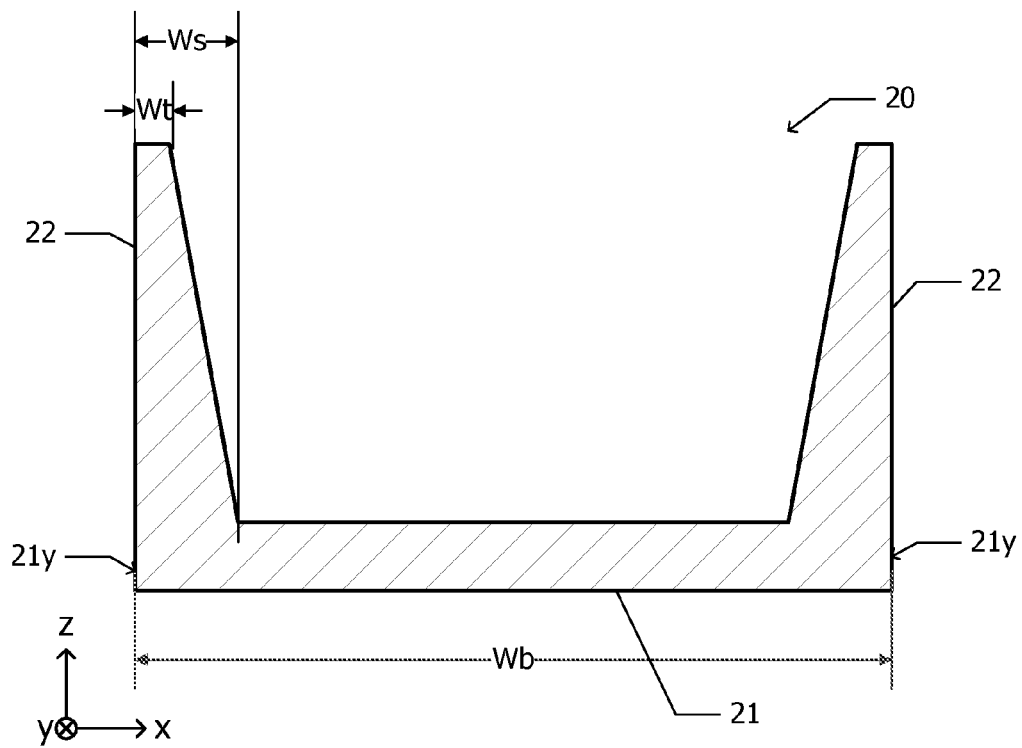
FIG. 15B is a cross-sectional view taken along one-dot chain line 15B-15B of FIG. 15A.

FIG. 15A illustrates a plan view of the lower housing 20 used for a power storage device according to further another embodiment. FIG. 15B illustrates a cross-sectional view taken along one-dot chain line 15B-15B of FIG. 15A. Hereinafter, differences from the embodiment illustrated in FIGS. 10A and 10B to FIG. 12 will be described, and description of an identical configuration will be omitted.

As illustrated in FIG. 15A, the bottom panel 21 includes a pair of edges 21y parallel to the y direction. As illustrated in FIG. 15B, the inside surfaces of the side panels 22 that are formed continuously with the pair of edges 21y incline with respect to the bottom panel 21. This structure is equivalent to the structure where the side panel ribs 38 (FIGS. 10B and 11) according to the embodiment shown in FIGS. 10A to 12 are continuously formed in the circumferential direction along the outer peripheral line of the bottom panel 21. For this reason, similar to the case of the embodiment shown in FIGS. 10A to 12, the rigidity of the lower housing 20 can be enhanced, and the natural frequency of the power storage device can be made to be high.

The thickness of the side panels 22 at the points of connection point with the bottom panel 21 is represented as Ws, the thickness of the side panels 22 at the uppermost portions is represented as Wt, and the spacing between the pair of edges 21y parallel in the y direction is represented as Wb. In order to obtain sufficient effects from a configuration in which lower portions of the side panels 22 are thickened compared to upper portions of the side panels, it is preferable to set the value of Ws/Wb equal to or greater than 0.03.

If the thickness Wt of the upper ends of the side panels 22 is excessively thickened, the weight reduction effects of the lower housing 20 are impaired. In order to obtain sufficient weight reduction effects of the lower housing 20, it is preferable to set the value of Wt/Ws equal to or less than ½. In addition, as illustrated in FIG. 12, the upper ends of the side panels 22 may be provided with a flange for allowing the fasteners 51 to pass therethrough. In this case, the thickness Wt may be defined except for the portion of the flange.

FIG. 16 illustrates a plan view of a lower housing used for a power storage device according to further another embodiment and parts mounted on the lower housing. Hereinafter, differences from the embodiment illustrated in FIGS. 10A and 10B to FIG. 12 will be described, and description of an identical configuration will be omitted.

In this embodiment, the first rib 25, the second rib 26, and the third ribs 27 are formed on the bottom panel 21 as well as the side panel libs 38 formed on the side panel 22. The first rib 25, the second rib 26, and the third ribs 27 have the same structures as the first rib 25, the second rib 26, and the third ribs 27 (FIGS. 1B and 2) formed on the lower housing 20 of the power storage device according to the embodiment shown in FIGS. 1A to 5B, respectively.

The rigidity of the lower housing 20 can be further enhanced by also providing the first rib 25, the second rib 26, and the third ribs 27 on the bottom panel 21. Additionally, by giving an inclination to the inside surfaces of the side panels 22, the weight of the lower housing 20 can be reduced compared to a case where the entire side panels 22 are made thick.

Figure 17:
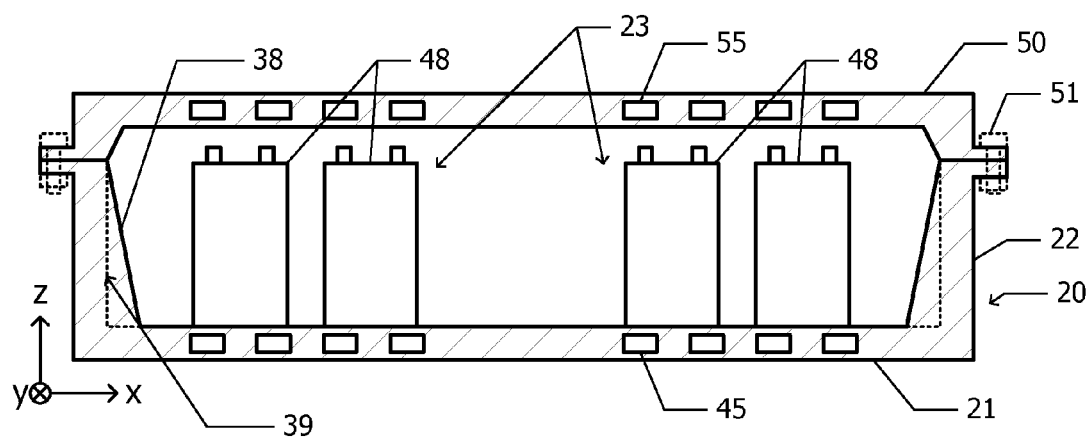
FIG. 17 is a cross-sectional view of a lower housing, a lid, and a power storage module mounted on the lower housing in a power storage device according to further another embodiment.

FIG. 17 illustrates a cross-sectional view of the lower housing 20, the lid 50, and the power storage modules 23 mounted on the lower housing 20 in a power storage device according to still further another embodiment. Hereinafter, differences from the embodiment illustrated in FIG. 12 will be described, and description of an identical configuration will be omitted.

Although the laminated power storage cell is used in the embodiment shown in FIGS. 10A to 12 as the power storage cell 40 constituting the power storage module 23, a can-type power storage cell 48 is used in the embodiment shown in FIG. 17. A plurality of the can type power storage cells 48 are fixed to the bottom panel 21 of the lower housing 20. The power storage module 23 is constituted by the plurality of power storage cells 48. In this embodiment shown in FIG. 17, the rigidity of the housing is also enhanced by forming the side panel ribs 38. For this reason, sufficient rigidity can be ensured.

Figure 18:
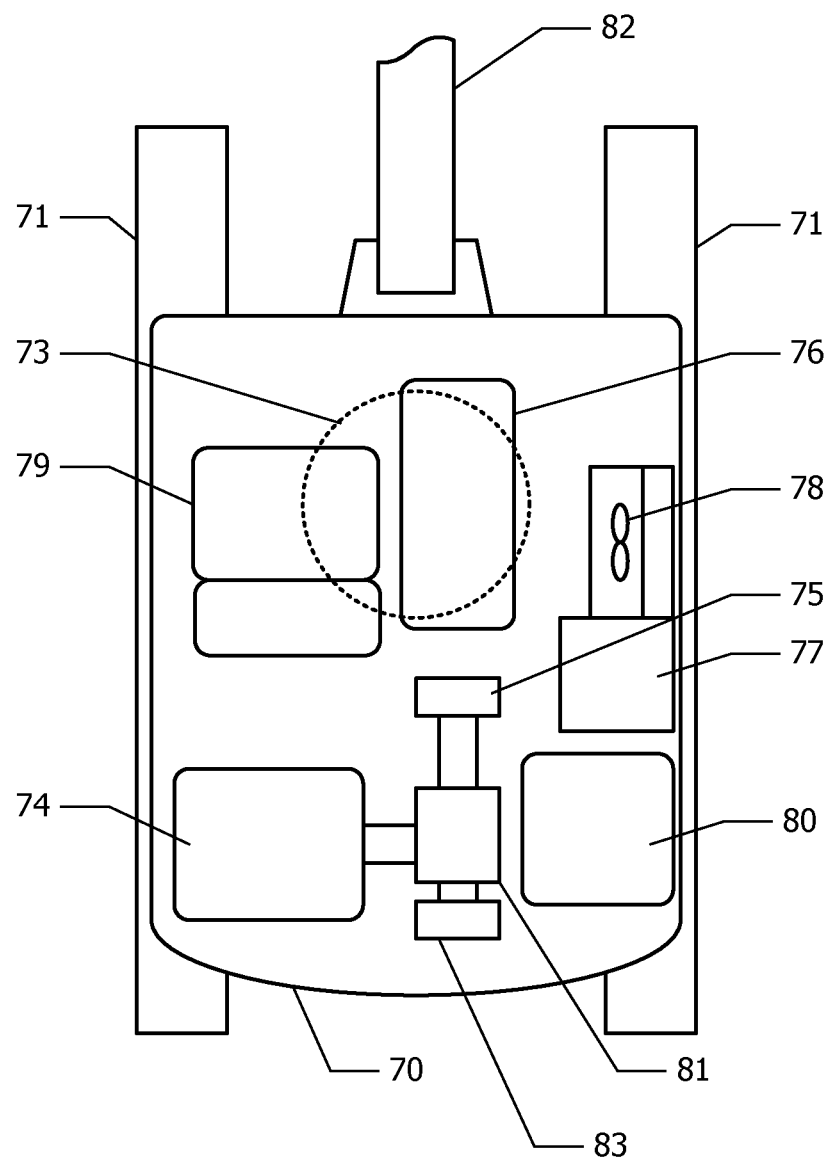
FIG. 18 is a plan view of a shovel according to still further another embodiment.

FIG. 18 illustrates a schematic plan view of a shovel as an example of a hybrid working machine according to further another embodiment. A lower traveling body 71 is attached to an upper swivel body 70 via a swiveling bearing 73. The upper swivel body 70 is mounted with an engine 74, a hydraulic pump 75, a swiveling motor (electrically driven part) 76, an oil tank 77, a cooling fan 78, a seat 79, a power storage device 80, a motor generator (electrically driven part) 83. The engine 74 generates motive power through combustion of fuel. The engine 74, the hydraulic pump 75, and the motor generator 83 mutually send and receive a torque via a torque transmission mechanism 81. The hydraulic pump 75 supplies pressurized oil to a hydraulic cylinder of a boom 82 or the like. The power storage devices according to the above embodiments shown in FIGS. 1A to 17 are used for the power storage device 80.

The motor generator 83 is driven by the motive power of the engine 74 to generate electricity (power-generating operation). The generated electric power is supplied to the power storage device 80, and the power storage device 80 is charged. Additionally, the motor generator 83 is driven by the electric power from the power storage device 80, and generates motive power for assisting the engine 74 (assisting operation). The oil tank 77 stores oil for a hydraulic circuit. The cooling fan 78 suppresses a rise in the oil temperature of the hydraulic circuit. An operator sits down on the seat 79 to manipulate the shovel.

The swiveling motor 76 is driven by the electric power supplied from the power storage device 80. The swiveling motor swivels the upper swivel body 70. Additionally, the swiveling motor 76 generates regenerative electric power by converting kinetic energy into electrical energy. The power storage device 80 is charged by the generated regenerative electric power.

Figure 19:
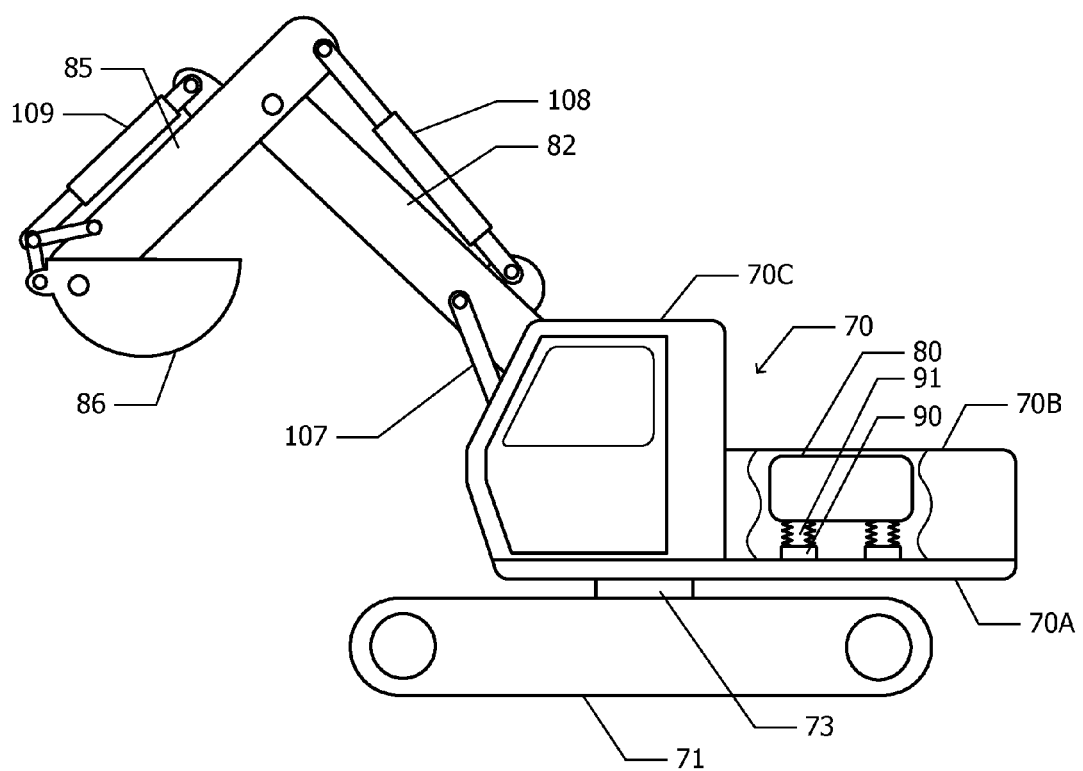
FIG. 19 is a side view of a shovel according to the embodiment shown in FIG. 18.

FIG. 19 illustrates a partially broken side view of the shovel according to the embodiment shown in FIG. 18. The upper swivel body 70 is mounted on the lower traveling body 71 via the swiveling bearing 73. The upper swivel body 70 includes a swiveling frame 70A, a cover 70B, and a cabin 70C. The swiveling frame 70A functions as a supporting structure that supports the cabin 70C and various parts. The cover 70B covers various parts mounted on the swiveling frame 70A, for example, the power storage device 80. The seat 79 (FIG. 18) is housed within the cabin 70C.

The swiveling motor 76 (FIG. 18) swivels the swiveling frame 70A, which is an object to be driven, in a clockwise direction or in a counterclockwise direction with respect to the lower traveling body 71. The boom 82 is attached to the upper swivel body 70. The boom 82 is swung in an up-and-down direction with respect to the upper swivel body 70 by the boom cylinder 107 that is hydraulically driven. An arm 85 is attached to the tip of the boom 82. The posture of the arm 85 is changed by the arm cylinder 108 that is hydraulically driven. A bucket 86 is attached to the tip of the arm 85. The bucket 86 is changed in posture by the bucket cylinder 109 that is hydraulically driven.

The power storage device 80 is mounted on the swiveling frame 70A via a mount 90 for a power storage device, and a damper (vibration-proofing device) 91. The power storage device 80 is arranged, for example, behind the cabin 70C. The cover 70B covers the power storage device 80.

The swiveling frame 70A vibrates greatly during traveling and working compared to general transportation vehicles. For this reason, the power storage device 80 mounted on the swiveling frame 70A is apt to receive a large shock. Since the power storage devices according to the above embodiments shown in FIGS. 1A to 17 are used for the power storage device 80, the number of parts of the power storage device can be reduced, and sufficient reliability can be ensured against a shock.

Although the invention has been described above on the basis of the embodiments, the invention is not limited to these embodiments. For example, it will be obvious to those skilled in the art that various changes, improvements, combinations, or the like are possible.

Inventions shown in the following Appendices are disclosed on the basis of the above embodiments.

Appendix 1

A power storage device including a lower housing having a bottom panel and side panels; at least two power storage modules arranged at a distance from each other in a first direction on the bottom panel and configured to charge and discharge electrical energy; a first rib formed on the bottom panel of the lower housing, arranged between the two power storage modules, and configured to extend in a second direction intersecting in the first direction; and a second rib formed on the bottom panel of the lower housing, configured to extend in the first direction, and formed continuously with the first rib.

Appendix 2

The power storage device according to Appendix 1, in which the second rib overlaps each of the power storage modules about the first direction.

Appendix 3

The power storage device according to Appendix 1 or 2, which further includes a lid configured to close an upper opening portion of the lower housing, and in which the first rib and the second rib are lower than the side panels, and gaps are formed between the first rib and the lid and between the second rib and the lid in a state where the opening portion of the lower housing is blocked with the lid.

Appendix 4

The power storage device according to any one of Appendices 1 to 3, in which the second rib extends in the first direction from the first rib, and reaches the side panels intersecting the first direction.

Appendix 5

The power storage device according to any one of Appendices 1 to 4, in which each of the power storage modules includes a plurality of plate-shaped power storage cells stacked in a thickness direction; and a pressurizing mechanism configured to apply a compressive force in a stacking direction to a stacked body of the power storage cells, and in which the second rib is arranged between the power storage cells within the power storage module, and the compressive force generated by the pressurizing mechanism is applied to the second rib.

Appendix 6

A power storage device including a lower housing having a bottom panel and side panels; at least two power storage modules arranged at a distance form each other in a first direction on the bottom panel and configured to charge and discharge electrical energy; and a first rib formed on the bottom panel, arranged between the two power storage modules, and configured to extend in a second direction intersecting in the first direction, the first rib being lower than the side panels, using the bottom panel as a reference.

Appendix 7

The power storage device according to Appendix 6, in which the height of the first rib is equal to or less than ⅔ of the height of the side panels.

Appendix 8

The power storage device according to Appendix 6 or 7, further including a relay circuit mounted on a position in the second direction at a distance from the power storage module; a second rib extending in the second direction from the first rib, being arranged between a region having the power storage module mounted thereon and a region having the relay circuit mounted thereon, being lower than the side panels, using the bottom panel as a reference; and a bus bar being configured to connect the power storage module and the relay circuit, the bus bar being arranged at a position higher than a top end surface of the second rib and being arranged at a position lower than top end surfaces of the side panels.

Appendix 9

The power storage device according to Appendix 6 or 7, in which each of the power storage modules includes a plurality of plate-shaped power storage cells stacked in a thickness direction; and a pressurizing mechanism configured to apply a compressive force in a stacking direction to a stacked body of the power storage cells, and in which the second rib is arranged between the power storage cells within the power storage module, and the compressive force generated by the pressurizing mechanism is applied to the second rib.

Appendix 10

A power storage device, which includes a housing having a bottom panel and side panels; a power storage module mounted on the bottom panel to perform charging and discharging of electrical energy; and a plurality of ribs formed on inner surfaces of the side panels, in which the ribs are in contact with the bottom panel, and extend upward from the bottom panel, and are discretely arranged in a circumferential direction.

Appendix 11

The power storage device according to Appendix 10, in which an inwardly-directed surface of each of the ribs inclines so that the rib becomes thinner upward from the bottom panel.

Appendix 12

A power storage device, which includes a housing having a bottom panel and side panels; and a power storage module mounted on the bottom panel to perform charging and discharging of electrical energy, in which the bottom panel includes a pair of first edges parallel to each other, and in which when the thickness of the portions of the side panels formed continuously with the first edges and connected to the bottom panel is represented as Ws, and the spacing between the first edges is represented as Wb, and the value of Ws/Wb is equal to or greater than 0.03.

Appendix 13

The power storage device according to Appendix 12, in which inwardly-directed surfaces formed continuously with the first edges incline so that the side panels become thinner upward from the bottom panel.

What is claimed is:

1. A shovel comprising:
a lower traveling body;
an upper swivel body mounted on the lower traveling body via a swiveling bearing;
a boom attached to the upper swivel body;
a power storage device mounted on the upper swivel body; and
an electrically driven part driven by discharged electric power from the power storage device,
wherein the power storage device includes:
a lower housing having a bottom panel, side panels, and an opening portion that opens upward;
a lid closing the opening portion;
at least two power storage modules arranged at a distance from each other in a first direction on the bottom panel and configured to charge and discharge electrical energy;
a first rib formed on the bottom panel of the lower housing, arranged between the two power storage modules, and configured to extend in a second direction intersecting in the first direction; and
a second rib formed on the bottom panel of the lower housing, configured to extend in the first direction, and formed continuously with the first rib,
wherein the lower housing and the lid apply a compressive force in a height direction to the power storage modules.

2. The shovel according to claim 1,
wherein the second rib overlaps each of the power storage modules about the first direction.

3. The shovel according to claim 2, wherein the power storage device further comprises a third rib, which respectively extend from both ends of the second rib in the second direction away from the power storage module and reach the one side panel.

4. The shovel according to claim 1, further comprising:
a lid configured to close an upper opening portion of the lower housing,
wherein the first rib and the second rib are lower than the side plates, and gaps are formed between the first rib and the lid and between the second rib and the lid in a state where the opening portion of the lower housing is closed with the lid.

5. The shovel according to claim 1,
wherein the second rib extends in the first direction from the first rib, and reaches the side panels intersecting the first direction.

6. The shovel according to claim 1, further comprising:
a plurality of side panel ribs formed on inside surfaces of the side panels,
wherein the side panel ribs are in contact with the bottom panel, extend upward from the bottom panel, and are discretely arranged in a circumferential direction.

7. The shovel according to claim 6,
wherein an inwardly-directed surface of each of the side panel ribs includes a region which inclines so that the side panel rib becomes thin upward from the bottom panel.

8. The shovel according to claim 1,
wherein the bottom panel of the lower housing includes a pair of first edges parallel to each other, and
wherein when the thickness of the portions of the side panels formed continuously with the first edges and connected to the bottom panel is represented as Ws, and the
spacing between the first edges is represented as Wb, the value of Ws/Wb is equal to or greater than 0.03.

9. The shovel according to claim 8,
wherein inwardly-directed surfaces of the side panels formed continuously with the first edges incline so that the side panels become thin upward from the bottom panel.

10. The shovel according to claim 1, wherein the side panels are arranged throughout an outer peripheral line of the bottom panel.

11. The shovel according to claim 10, wherein each of the power storage module is disposed between one side panel and the first rib in the first direction and between one side panel and the second rib in the second direction.

12. The shovel according to claim 1, wherein the bottom panel, the side panels, the first rib and the second rib are integrally molded by a casting process.

13. A shovel comprising:
a power storage device; and
an electrically driven part driven by discharged electric power from the power storage device,
wherein the power storage device includes:
a lower housing having a bottom panel and side panels;
at least two power storage modules arranged at a distance from each other in a first direction on the bottom panel and configured to charge and discharge electrical energy;
a first rib formed on the bottom panel of the lower housing, arranged between the two power storage modules, and configured to extend in a second direction intersecting in the first direction; and
a second rib formed on the bottom panel of the lower housing, configured to extend in the first direction, and formed continuously with the first rib,
wherein each of the power storage modules includes:
a plurality of plate-shaped power storage cells stacked in a thickness direction; and
a pressurizing mechanism configured to apply a compressive force in a stacking direction to a stacked body of the power storage cells, and
wherein the second rib is arranged between the power storage cells within the power storage module, and the compressive force generated by the pressurizing mechanism is applied to the second rib.

14. The shovel according to claim 13,
wherein the pressurizing mechanism has pressurizing plates arranged at both ends of the stacked body of the power storage cells stacked in the thickness direction,
wherein the power storage cells are connected in series, and
wherein the power storage module further includes:
an insulator fixed to an outside surface of each of the pressurizing plates; and
terminals attached to the insulator and electrically connected to both ends of a series connection circuit of the power storage cells.

* * * * *